(12) United States Patent
Togino

(10) Patent No.: US 6,850,370 B2
(45) Date of Patent: Feb. 1, 2005

(54) IMAGE-FORMING OPTICAL SYSTEM

(75) Inventor: Takayoshi Togino, Koganei (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/054,821

(22) Filed: Jan. 25, 2002

(65) Prior Publication Data
US 2002/0163742 A1 Nov. 7, 2002

Related U.S. Application Data

(62) Division of application No. 09/501,320, filed on Feb. 10, 2000, now abandoned.

(30) Foreign Application Priority Data

Feb. 12, 1999 (JP) .............................. 11-034314

(51) Int. Cl.$^7$ .............................. G02B 5/04; G02B 27/14
(52) U.S. Cl. ...................... 359/631; 359/633; 359/637; 359/834
(58) Field of Search ................................ 359/631, 633, 359/637, 727, 728, 729, 730, 731, 834

(56) References Cited

U.S. PATENT DOCUMENTS

| | | | |
|---|---|---|---|
| 2,896,498 A | 7/1959 | Brandon | |
| 5,669,194 A | 9/1997 | Takahashi | |
| 5,699,194 A | 12/1997 | Takahashi | |
| 5,936,773 A | 8/1999 | Togino | |
| 6,104,537 A | 8/2000 | Togino | |
| 6,128,137 A * | 10/2000 | Togino | 359/631 |
| 6,178,048 B1 | 1/2001 | Togino et al. | |
| 6,178,052 B1 | 1/2001 | Aoki et al. | |
| 6,201,646 B1 | 3/2001 | Togino et al. | |
| 6,222,676 B1 | 4/2001 | Togino et al. | |
| 6,268,963 B1 | 7/2001 | Akiyama | |
| 6,278,556 B1 | 8/2001 | Togino | |
| 6,301,064 B1 * | 10/2001 | Araki et al. | 359/633 |
| 6,522,475 B2 * | 2/2003 | Akiyama et al. | 359/731 |

FOREIGN PATENT DOCUMENTS

| | | | |
|---|---|---|---|
| JP | 07333505 A | 12/1995 | |
| JP | 08292368 A | 11/1996 | |
| JP | 08292371 A | 11/1996 | |
| JP | 08292372 A | 11/1996 | |
| JP | 09005650 A | 1/1997 | |
| JP | 09090229 A | 4/1997 | |
| JP | 09211331 A | 8/1997 | |
| JP | 09222561 A | 8/1997 | |
| JP | 09222563 A | 8/1997 | |
| JP | 09258105 A | 10/1997 | |
| JP | 09258106 A | 10/1997 | |
| JP | 10020196 A | 1/1998 | |
| JP | 10068884 A | 3/1998 | |
| JP | 10-197705 | 7/1998 | |

OTHER PUBLICATIONS

Patent Abstracts of Japan; Aug. 22, 2000; re JP 2000-231060, Application No. 11-034314.*

* cited by examiner

Primary Examiner—Ricky D. Shafer
(74) Attorney, Agent, or Firm—Pillsbury Winthrop LLP

(57) ABSTRACT

The present invention relates to a high-performance image-forming optical system made compact and thin by folding an optical path using reflecting surfaces arranged to minimize the number of reflections. A prism member 10 has a first entrance surface 11, first to fourth reflecting surfaces 12 to 15, and a first exit surface 16. An optical path incident on the first reflecting surface 12 and an optical path reflected from the second reflecting surface 13 form intersecting optical paths. An optical path incident on the third reflecting surface 14 and an optical path reflected from the fourth reflecting surface 15 form intersecting optical paths. At least either one of the first reflecting surface 12 and the second reflecting surface 13 and at least either one of the third reflecting surface 14 and the fourth reflecting surface 15 have a rotationally asymmetric curved surface configuration that gives a power to a light beam and corrects aberrations due to decentration. An intermediate image plane is formed between the first reflecting surface 12 and the fourth reflecting surface 15.

10 Claims, 14 Drawing Sheets

IMAGE-FORMING OPTICAL SYSTEM

CROSS REFERENCE TO RELATED APPLICATION

This application is a divisional of U.S. application Ser. No. 09/501,320, filed Feb. 10, 2000, now abandoned the specification and drawings of which are incorporated herein by reference.

BACKGROUND OF THE INVENTION

The present invention relates to image-forming optical systems. More particularly, the present invention relates to a decentered optical system with a reflecting surface having a power for use in optical apparatus using a small-sized image pickup device, e.g. video cameras, digital still cameras, film scanners, and endoscopes.

Recently, with the achievement of small-sized image pickup devices, image-forming optical systems for use in video cameras, digital still cameras, film scanners, endoscopes, etc. have also been demanded to be reduced in size and weight and also in cost.

In the general rotationally symmetric coaxial optical systems, however, optical elements are arranged in the direction of the optical axis. Therefore, there is a limit to the reduction in thickness of the optical systems. At the same time, the number of lens elements unavoidably increases because it is necessary to correct chromatic aberration produced by a rotationally symmetric refracting lens used in the optical systems. Therefore, it is difficult to reduce the cost in the present state of the art. Under these circumstances, there have recently been proposed optical systems designed to be compact in size by giving a power to a reflecting surface, which produces no chromatic aberration, and folding an optical path in the optical axis direction.

Japanese Patent Application Unexamined Publication (KOKAI) Number [hereinafter referred to as "JP(A)"] 7-333505 proposes to reduce the thickness of an optical system by giving a power to a decentered reflecting surface and thus folding an optical path. In an example thereof, however, the number of constituent optical members is as large as five, and actual optical performance is unclear. No mention is made of the configuration of the reflecting surface.

JP(A) 8-292371, 9-5650 and 9-90229 each disclose an optical system in which an optical path is folded by a single prism or a plurality of mirrors integrated into a single block, and an image is relayed in the optical system to form a final image. In these conventional examples, however, the number of reflections increases because the image is relayed. Accordingly, surface accuracy errors and decentration accuracy errors are transferred while being added up. Consequently, the accuracy required for each surface becomes tight, causing the cost to increase unfavorably. The relay of the image also causes the overall volumetric capacity of the optical system to increase unfavorably.

JP(A) 9-222563 discloses an example of an optical system that uses a plurality of prisms. However, because the optical system is arranged to relay an image, the cost increases and the optical system becomes large in size unfavorably for the same reasons as stated above.

JP(A) 9-211331 discloses an example of an optical system in which an optical path is folded by using a single prism to achieve a reduction in size of the optical system. However, the optical system is not satisfactorily corrected for aberrations.

JP(A) 8-292368, 8-292372, 9-222561, 9-258105 and 9-258106 all disclose examples of zoom lens systems. In these examples, however, the number of reflections is undesirably large because an image is relayed in a prism. Therefore, surface accuracy errors and decentration accuracy errors of reflecting surfaces are transferred while being added up, unfavorably. At the same time, the overall size of the optical system unavoidably increases, unfavorably.

JP(A) 10-20196 discloses an example of a two-unit zoom lens system having a positive front unit and a negative rear unit, in which the positive front unit comprises a prism of negative power placed on the object side of a stop and a prism of positive power placed on the image side of the stop. JP(A) 10-20196 also discloses an example in which the positive front unit, which comprises a prism of negative power and a prism of positive power, is divided into two to form a three-unit zoom lens system having a negative unit, a positive unit and a negative unit. However, the prisms used in these examples each have two transmitting surfaces and two reflecting surfaces, which are all independent surfaces. Therefore, a relatively wide space must be ensured for the prisms. In addition, the image plane is large in size in conformity to the Leica size film format. Accordingly, the prisms themselves become unavoidably large in size. Furthermore, because the disclosed zoom lens systems are not telecentric on the image side, it is difficult to apply them to image pickup devices such as CCDs. In either of the examples of zoom lens systems, zooming is performed by moving the prisms. Accordingly, the decentration accuracy required for the reflecting surfaces becomes tight in order to maintain the required performance over the entire zooming range, resulting in an increase in the cost.

When a general refracting optical system is used to obtain a desired refracting power, chromatic aberration occurs at an interface surface thereof according to chromatic dispersion characteristics of an optical element. To correct the chromatic aberration and also correct other ray aberrations, the refracting optical system needs a large number of constituent elements, causing the cost to increase. In addition, because the optical path extends straight along the optical axis, the entire optical system undesirably lengthens in the direction of the optical axis, resulting in an unfavorably large-sized image pickup apparatus.

In decentered optical systems such as those described above in regard to the prior art, an imaged figure or the like is undesirably distorted and the correct shape cannot be reproduced unless the formed image is favorably corrected for aberrations, particularly rotationally asymmetric distortion.

Furthermore, in a case where a reflecting surface is used in a decentered optical system, the sensitivity to decentration errors of the reflecting surface is twice as high as that in the case of a refracting surface, and as the number of reflections increases, decentration errors that are transferred while being added up increase correspondingly. Consequently, manufacturing accuracy and assembly accuracy, e.g. surface accuracy and decentration accuracy, required for reflecting surfaces become even more strict.

SUMMARY OF THE INVENTION

In view of the above-described problems with the prior art, an object of the present invention is to provide a high-performance and low-cost image-forming optical system having a reduced number of constituent optical elements.

Another object of the present invention is to provide a high-performance image-forming optical system that is made compact and thin by folding an optical path using reflecting surfaces arranged to minimize the number of reflections.

The image-forming optical system according to the present invention provided to attain the above-described objects is an image-forming optical system having a positive refracting power as a whole for forming an object image. The image-forming optical system has a prism member formed from a medium having a refractive index (n) larger than 1 (n>1). The prism member has a first entrance surface through which a light beam from an object enters the prism member. The prism member further has a first reflecting surface, a second reflecting surface, a third reflecting surface and a fourth reflecting surface, which reflect the light beam in the prism member. Further, the prism member has a first exit surface through which the light beam exits from the prism member. An optical path connecting the second reflecting surface and the third reflecting surface intersects an optical path connecting the first entrance surface and the first reflecting surface, and the optical path connecting the second reflecting surface and the third reflecting surface intersects an optical path connecting the fourth reflecting surface and the first exit surface. At least either one of the first reflecting surface and the second reflecting surface has a curved surface configuration that gives a power to a light beam. The curved surface configuration is a rotationally asymmetric surface configuration that corrects aberrations due to decentration. At least either one of the third reflecting surface and the fourth reflecting surface has a curved surface configuration that gives a power to a light beam. The curved surface configuration is a rotationally asymmetric surface configuration that corrects aberrations due to decentration. Moreover, an intermediate image plane is formed between the first reflecting surface and the fourth reflecting surface.

The reasons for adopting the above-described arrangement in the present invention, together with the function thereof, will be described below in order.

The image-forming optical system according to the present invention, which is provided to attain the above-described objects, has a positive refracting power as a whole for forming an object image. The image-forming optical system has a prism member formed from a medium having a refractive index (n) larger than 1 (n>1). The prism member has a first entrance surface through which a light beam from an object enters the prism member. The prism member further has a first reflecting surface, a second reflecting surface, a third reflecting surface and a fourth reflecting surface, which reflect the light beam in the prism member. Further, the prism member has a first exit surface through which the light beam exits from the prism member. An optical path connecting the second reflecting surface and the third reflecting surface intersects an optical path connecting the first entrance surface and the first reflecting surface, and the optical path connecting the second reflecting surface and the third reflecting surface intersects an optical path connecting the fourth reflecting surface and the first exit surface.

A refracting optical element such as a lens is provided with a power by giving a curvature to an interface surface thereof. Accordingly, when rays are refracted at the interface surface of the lens, chromatic aberration unavoidably occurs according to chromatic dispersion characteristics of the refracting optical element. Consequently, the common practice is to add another refracting optical element for the purpose of correcting the chromatic aberration.

Meanwhile, a reflecting optical element such as a mirror or a prism produces no chromatic aberration in theory even when a reflecting surface thereof is provided with a power, and need not add another optical element only for the purpose of correcting chromatic aberration. Accordingly, an optical system using a reflecting optical element allows the number of constituent optical elements to be reduced from the viewpoint of chromatic aberration correction in comparison to an optical system using a refracting optical element.

At the same time, a reflecting optical system using a reflecting optical element allows the optical system itself to be compact in size in comparison to a refracting optical system because the optical path is folded in the reflecting optical system.

Reflecting surfaces require a high degree of accuracy for assembly and adjustment because they have high sensitivity to decentration errors in comparison to refracting surfaces. However, among reflecting optical elements, prisms, in which the positional relationship between surfaces is fixed, only need to control decentration as a single unit of prism and do not need high assembly accuracy and a large number of man-hours for adjustment as are needed for other reflecting optical elements.

Furthermore, a prism has an entrance surface and an exit surface, which are refracting surfaces, and a reflecting surface. Therefore, the degree of freedom for aberration correction is high in comparison to a mirror, which has only a reflecting surface. In particular, if the prism reflecting surface is assigned the greater part of the desired power to thereby reduce the powers of the entrance and exit surfaces, which are refracting surfaces, it is possible to reduce chromatic aberration to a very small quantity in comparison to refracting optical elements such as lenses while maintaining the degree of freedom for aberration correction at a high level in comparison to mirrors. Furthermore, the inside of a prism is filled with a transparent medium having a refractive index higher than that of air. Therefore, it is possible to obtain a longer optical path length than in the case of air. Accordingly, the use of a prism makes it possible to obtain an optical system that is thinner and more compact than those formed from lenses, mirrors and so forth, which are placed in the air.

In the present invention, a prism member comprising one or two decentered prisms is placed, and an object-side portion and image-side portion of the prism member are arranged to correct each other's decentration aberrations, thereby enabling not only axial aberrations but also off-axis aberrations to be favorably corrected. If the number of reflections is one in each of the portions, it is impossible to correct decentration aberrations completely.

For the reasons stated above, the present invention is arranged so that a light beam is reflected four times in the prism member, and an intermediate image plane is formed in an optical path between the first reflecting surface and the fourth reflecting surface.

In the present invention, it is important that the axial principal ray should intersect itself twice in the prism (which may be a single integral prism or a combination of two separate prisms). If the axial principal ray substantially intersects itself twice in the optical system, the optical system can be folded so as to be compact in size.

The object-side portion of the prism member in the present invention has a first entrance surface, a first reflecting surface and a second reflecting surface and is arranged so that an optical path connecting the second reflecting surface and a third reflecting surface intersects an optical path connecting the first entrance surface and the first reflecting surface.

The prism object-side portion having such a configuration enables an increase in the degree of freedom for aberration correction and produces minimal aberrations. In addition, because the two reflecting surfaces of the prism object-side portion (i.e. the first reflecting surface and the second reflecting surface) can be positioned with a high degree of symmetry, aberrations produced by the two reflecting surfaces are corrected with these reflecting surfaces by canceling the aberrations each other. Therefore, the amount of aberration produced in the prism object-side portion is small. Furthermore, because the optical paths intersect each other in the prism object-side portion, the optical path length can be made long in comparison to a prism structure in which the optical path is simply folded. Accordingly, the prism object-side portion can be made compact in size, considering its optical path length. It is more desirable that the two reflecting surfaces in the prism object-side portion should have powers of different signs. By doing so, it is possible to enhance the effect of correcting each other's aberrations by the two reflecting surfaces and hence possible to obtain high resolution.

In addition, if the prism object-side portion is formed by using a prism structure in which the optical paths intersect each other as stated above, it is possible to construct the prism object-side portion in a compact form. The reason for this is as follows. In a comparison between the prism structure of the present invention and a prism structure of the same two-reflection type which has the same optical path length as that of the above-described prism structure and in which a Z-shaped optical path is formed, the prism structure of the present invention provides a higher space utilization efficiency. In the prism configuration having a Z-shaped optical path, rays invariably travel through different regions of the prism one by one, whereas in the prism in which the optical paths intersect each other, rays pass through the same region twice. Accordingly, the prism can be made compact in size.

The image-side (image-formation plane-side) portion of the prism member in the present invention has a third reflecting surface, a fourth reflecting surface and a first exit surface and is arranged so that the optical path connecting the second reflecting surface and the third reflecting surface intersects an optical path connecting the fourth reflecting surface and the first exit surface.

The arrangement of the prism image-side portion is similar to the arrangement of the above-described prism object-side portion. Thus, the prism image-side portion similarly enables an increase in the degree of freedom for aberration correction and produces minimal aberrations. In addition, because the two reflecting surfaces of the prism image-side portion (i.e. the third reflecting surface and the fourth reflecting surface) can be positioned with a high degree of symmetry, aberrations produced by the two reflecting surfaces are corrected with these reflecting surfaces by canceling the aberrations each other. Therefore, the amount of aberration produced in the prism image-side portion is small. Furthermore, because the optical paths intersect each other in the prism image-side portion, the optical path length can be made long in comparison to a prism structure in which the optical path is simply folded. Accordingly, the prism image-side portion can be made compact in size, considering its optical path length. It is more desirable that the two reflecting surfaces in the prism image-side portion should have powers of different signs. By doing so, it is possible to enhance the effect of correcting each other's aberrations by the two reflecting surfaces and hence possible to obtain high resolution.

In addition, if the prism image-side portion is formed by using a prism structure in which the optical paths intersect each other as stated above, it is possible to construct the prism image-side portion in a compact form. The reason for this is as follows. In a comparison between the prism structure of the present invention and a prism structure of the same two-reflection type which has the same optical path length as that of the above-described prism structure and in which a Z-shaped optical path is formed, the prism structure of the present invention provides a higher space utilization efficiency. In the prism configuration having a Z-shaped optical path, rays invariably travel through different regions of the prism one by one, whereas in the prism in which the optical paths intersect each other, rays pass through the same region twice. Accordingly, the prism can be made compact in size.

Incidentally, in the present invention, the prism member may be formed from a combination of prisms cemented together or a single prism produced by integral molding. It is also possible to form the prism member from a combination of a first prism constituting the prism object-side portion and a second prism constituting the prism image-side portion.

When a light ray from the object center that passes through the center of the stop and reaches the center of the image plane is defined as an axial principal ray, if at least one reflecting surface of the object-side portion of the prism member in the present invention and at least one reflecting surface of the image-side portion of the prism member are not decentered with respect to the axial principal ray, the axial principal ray travels along the same optical path when incident on and reflected from each of the reflecting surfaces, and thus the axial principal ray is intercepted in the optical system undesirably. As a result, an image is formed from only a light beam whose central portion is shaded. Consequently, the center of the image is unfavorably dark, or no image is formed in the center of the image field.

In addition, at least either one of the first reflecting surface and the second reflecting surface of the object-side portion of the prism member in the present invention has a curved surface configuration that gives a power to a light beam, and the curved surface configuration is a rotationally asymmetric surface configuration that corrects aberrations due to decentration. Moreover, at least either one of the third reflecting surface and the fourth reflecting surface of the image-side portion of the prism member has a curved surface configuration that gives a power to a light beam, and the curved surface configuration is a rotationally asymmetric surface configuration that corrects aberrations due to decentration.

The reasons for adopting the above-described arrangements will be described below in detail.

First, a coordinate system used in the following description and rotationally asymmetric surfaces will be described.

An optical axis defined by a straight line along which the axial principal ray travels until it intersects the first surface of the optical system is defined as a Z-axis. An axis perpendicularly intersecting the Z-axis in the decentration plane of each surface constituting the imaging optical system is defined as a Y-axis. An axis perpendicularly intersecting the optical axis and also perpendicularly intersecting the Y-axis is defined as an X-axis. Ray tracing is forward ray tracing in which rays are traced from the object toward the image plane.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole.

On the other hand, rotationally symmetric aspherical surfaces and the like are used to correct aberrations favorably with a minimal number of surfaces. The reason for this is to reduce various aberrations that would be produced by spherical surfaces.

However, in a decentered optical system, rotationally asymmetric aberrations due to decentration cannot be corrected by a rotationally symmetric optical system. Rotationally asymmetric aberrations due to decentration include distortion, curvature of field, and astigmatic and comatic aberrations, which occur even on the axis.

First, rotationally asymmetric curvature of field will be described. For example, when rays from an infinitely distant object point are incident on a decentered concave mirror, the rays are reflected by the concave mirror to form an image. In this case, the back focal length from that portion of the concave mirror on which the rays strike to the image surface is a half the radius of curvature of the portion on which the rays strike in a case where the medium on the image side is air. Consequently, as shown in FIG. 17, an image surface tilted with respect to the axial principal ray is formed. It is impossible to correct such rotationally asymmetric curvature of field by a rotationally symmetric optical system.

To correct the tilted curvature of field by the concave mirror M itself, which is the source of the curvature of field, the concave mirror M is formed from a rotationally asymmetric surface, and, in this example, the concave mirror M is arranged such that the curvature is made strong (refracting power is increased) in the positive direction of the Y-axis, whereas the curvature is made weak (refracting power is reduced) in the negative direction of the Y-axis. By doing so, the tilted curvature of field can be corrected. It is also possible to obtain a flat image surface with a minimal number of constituent surfaces by placing a rotationally asymmetric surface having the same effect as that of the above-described arrangement in the optical system separately from the concave mirror M.

It is preferable that the rotationally asymmetric surface should be a rotationally asymmetric surface having no axis of rotational symmetry in the surface nor out of the surface. If the rotationally asymmetric surface has no axis of rotational symmetry in the surface nor out of the surface, the degree of freedom increases, and this is favorable for aberration correction.

Next, rotationally asymmetric astigmatism will be described.

A decentered concave mirror M produces astigmatism even for axial rays, as shown in FIG. 18, as in the case of the above. The astigmatism can be corrected by appropriately changing the curvatures in the X- and Y-axis directions of the rotationally asymmetric surface as in the case of the above.

Rotationally asymmetric coma will be described below.

A decentered concave mirror M produces coma even for axial rays, as shown in FIG. 19, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

The image-forming optical system according to the present invention may also be arranged such that the above-described at least one surface having a reflecting action is decentered with respect to the axial principal ray and has a rotationally asymmetric surface configuration and further has a power. By adopting such an arrangement, decentration aberrations produced as the result of giving a power to the reflecting surface can be corrected by the surface itself. In addition, the power of the refracting surfaces of the prism is reduced, and thus chromatic aberration produced in the prism can be minimized.

The above-described rotationally asymmetric surface used in the present invention should preferably be a plane-symmetry free-form surface having only one plane of symmetry. Free-form surfaces used in the present invention are defined by the following equation (a). It should be noted that the Z-axis of the defining equation is the axis of a free-form surface.

$$Z = cr^2 / \left[1 + \sqrt{\{1-(1+k)c^2r^2\}}\right] + \sum_{j=2}^{66} C_j X^m Y^n \qquad (a)$$

In Eq. (a), the first term is a spherical surface term, and the second term is a free-form surface term.

In the spherical surface term:
c: the curvature at the vertex
k: a conic constant
r=$\sqrt{(X^2+Y^2)}$ The free-form surface term is given by $$\sum_{j=2}^{66} C_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \cdots$$

where $C_j$ (j is an integer of 2 or higher) are coefficients.

In general, the above-described free-form surface does not have planes of symmetry in both the XZ- and YZ-planes. In the present invention, however, a free-form surface having only one plane of symmetry parallel to the YZ-plane is obtained by making all terms of odd-numbered degrees with respect to X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . are set equal to zero. By doing so, it is possible to obtain a free-form surface having only one plane of symmetry parallel to the YZ-plane.

A free-form surface having only one plane of symmetry parallel to the XZ-plane is obtained by making all terms of odd-numbered degrees with respect to Y zero. For example, in the above defining equation (a), the coefficients of the terms $C_3$, $C_5$, $C_8$, $C_{10}$, $C_{13}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, productivity can be improved.

It should be noted that the above defining equation (a) is shown as merely an example, and that the feature of the present invention resides in that rotationally asymmetric aberrations due to decentration are corrected and, at the same time, productivity is improved by using a rotationally asymmetric surface having only one plane of symmetry. Therefore, the same advantageous effect can be obtained for any other defining equation that expresses such a rotationally asymmetric surface.

The image-forming optical system according to the present invention is an intermediate image formation type image-forming optical system in which an intermediate image plane is formed between the first reflecting surface and the fourth reflecting surface. By the first entrance surface, the first reflecting surface and the second reflecting surface, a light beam is rotated along a triangular path, thereby forming first intersecting optical paths. By the third reflecting surface, the fourth reflecting surface and the first exit surface, a light beam is rotated along a triangular path, thereby forming second intersecting optical paths. The direction of rotation of the light beam traveling along the triangular path to form the first intersecting optical paths and the direction of rotation of the light beam traveling along the triangular path to form the second intersecting optical paths may be either the same or opposite to each other. The planes of rotation of the light beams may not extend parallel to each other but intersect each other, as a matter of course.

It is desirable that both the first reflecting surface and the second reflecting surface should have a curved surface configuration that gives a power to a light beam, and the curved surface configuration should be a rotationally asymmetric surface configuration that corrects aberrations due to decentration.

It is desirable for both the third reflecting surface and the fourth reflecting surface to have a rotationally asymmetric surface configuration that gives a power to a light beam and corrects aberrations due to decentration.

It is desirable for the first entrance surface to have a rotationally asymmetric surface configuration that gives a power to a light beam and corrects aberrations due to decentration.

It is desirable for the first exit surface to have a rotationally asymmetric surface configuration that gives a power to a light beam and corrects aberrations due to decentration.

In the above, it is desirable that the rotationally asymmetric surface configuration should be a plane-symmetry free-form surface having only one plane of symmetry.

In this case, the one and only plane of symmetry of the plane-symmetry free-form surface may be coincident with a plane formed by the axial principal ray traveling along the first intersecting optical paths.

The one and only plane of symmetry of the plane-symmetry free-form surface may be coincident with a plane formed by the axial principal ray traveling along the second intersecting optical paths.

The intermediate image plane may be formed between the second reflecting surface and the third reflecting surface.

In this case, it is desirable that the optical surfaces of the prism member that are closer to the object side than the intermediate image plane should be arranged to correct decentration aberrations as a whole and the optical surfaces of the prism member that are closer to the image-formation plane side than the intermediate image plane should be arranged to correct decentration aberrations as a whole so that the intermediate image plane is formed in an approximately planar shape.

Let us define the power of a decentered optical system and that of a decentered optical surface. As shown in FIG. 20, when the direction of decentration of a decentered optical system S is taken in the Y-axis direction, a light ray which is parallel to the axial principal ray of the decentered optical system S and which has a small height d in the YZ-plane is made to enter the decentered optical system S from the object side thereof. The angle that is formed between that ray and the axial principal ray exiting from the decentered optical system S as the two rays are projected onto the YZ-plane is denoted by $\delta y$, and $\delta y/d$ is defined as the power Py in the Y-direction of the decentered optical system S. A light ray which is parallel to the axial principal ray of the decentered optical system and which has a small height d in the X-direction, which is perpendicular to the YZ-plane, is made to enter the decentered optical system from the object side thereof. The angle that is formed between that ray and the axial principal ray exiting from the decentered optical system S as the two rays are projected onto a plane perpendicularly intersecting the YZ-plane and containing the axial principal ray is denoted by $\delta x$, and $\delta x/d$ is defined as the power Px in the X-direction of the decentered optical system S. The power Pyn in the Y-direction and power Pxn in the X-direction of a decentered optical surface n constituting the decentered optical system S are defined in the same way as the above.

Furthermore, the reciprocals of the above-described powers are defined as the focal length Fy in the Y-direction of the decentered optical system, the focal length Fx in the X-direction of the decentered optical system, the focal length Fyn in the Y-direction of the decentered optical surface n, and the focal length Fxn in the X-direction of the decentered optical surface n, respectively.

When the powers in the X- and Y-directions of the two reflecting surfaces (the first reflecting surface and the second reflecting surface) of the prism object-side portion that form intersecting optical paths are denoted by Px1-1, Py1-1, Px1-2 and Py1-2, respectively, in order from the object side, and the powers in the X- and Y-directions of the entire optical system are denoted by Px and Py, respectively, it is important to satisfy the following condition:

$$0.4 < Px1\text{-}1/Px < 1.1 \tag{1}$$

This condition defines the ratio of the power in the X-direction of the first reflecting surface to the power in the X-direction of the entire system. If Px1-1/Px is not larger than the lower limit, i.e. 0.4, the positive power of the first reflecting surface becomes excessively small, and it becomes necessary to assign a positive power to another surface. Consequently, the aberration correcting performance degrades. If Px1-1/Px is not smaller than the upper limit, i.e. 1.1, the positive power assigned to the first reflecting surface becomes excessively strong. Consequently, decentration aberrations produced by this surface become excessively large and hence difficult to correct by another surface.

It is even more desirable to satisfy the following condition:

$$0.6 < Px1\text{-}1/Px < 1.0 \tag{1-1}$$

Next, it is preferable to satisfy the following condition:

$$0.1 < Px1\text{-}2/Px < 0.6 \tag{2}$$

This condition defines the ratio of the power in the X-direction of the second reflecting surface to the power in the X-direction of the entire system. If Px1-2/Px is not larger than the lower limit, i.e. 0.1, the positive power of the second reflecting surface becomes excessively small, and it becomes necessary to assign a positive power to another surface. Consequently, the aberration correcting performance degrades. If Px1-2/Px is not smaller than the upper limit, i.e. 0.6, the positive power assigned to the second reflecting surface becomes excessively strong. Consequently, decentration aberrations produced by this surface become excessively large and hence difficult to correct by another surface.

It is even more desirable to satisfy the following condition:

$$0.1 < Px1\text{-}2/Px < 0.4 \tag{2-1}$$

When the powers in the X- and Y-directions of the two reflecting surfaces (the third reflecting surface and the fourth reflecting surface) of the prism image-side portion that form intersecting optical paths are denoted by Px2-1, Py2-1, Px2-2 and Py2-2, respectively, in order from the object side, and the powers in the X- and Y-directions of the entire optical system are denoted by Px and Py, respectively, it is preferable to satisfy the following condition:

$$0.2 < Px2\text{-}1/Px < 1 \tag{3}$$

This condition defines the ratio of the power in the X-direction of the third reflecting surface to the power in the X-direction of the entire system. If Px2-1/Px is not larger than the lower limit, i.e. 0.2, the positive power of the third reflecting surface becomes excessively small, and it becomes necessary to assign a positive power to another surface. Consequently, the aberration correcting performance degrades. If Px2-1/Px is not smaller than the upper limit, i.e. 1, the positive power assigned to the third reflecting surface becomes excessively strong. Consequently, decentration aberrations produced by this surface become excessively large and hence difficult to correct by another surface.

It is even more desirable to satisfy the following condition:

$$0.2 < Px2\text{-}1/Px < 0.8 \tag{3-1}$$

It is still more desirable to satisfy all the above-described conditions from the viewpoint of favorably correcting aberrations.

When the ratio of the power Px2-1 in the X-direction to the power Py2-1 in the Y-direction of the third reflecting surface is expressed by Px2-1/Py2-1, it is preferable to satisfy the following condition:

$$0.5 < Px2\text{-}1/Py2\text{-}1 < 2.0 \tag{4}$$

This condition defines the ratio of the power in the X-direction to the power in the Y-direction of the third reflecting surface. If Px2-1/Py2-1 is not larger than the lower limit, i.e. 0.5, the power in the X-direction becomes excessively small with respect to the power in the Y-direction. Consequently, large astigmatic aberrations due to decentration occur. On the other hand, if Px2-1/Py2-1 is not smaller than the upper limit, i.e. 2.0, the power in the X-direction becomes excessively large with respect to the power in the Y-direction. Consequently, astigmatic aberrations due to decentration occur undesirably in the opposite direction.

It is even more desirable to satisfy the following condition:

$$0.5 < Px2\text{-}1/Py2\text{-}1 < 1.5 \tag{4-1}$$

In the image-forming optical system according to the present invention, focusing of the image-forming optical system can be effected by moving all the constituent elements or moving the prism. However, it is also possible to effect focusing by moving the image-formation plane in the direction of the axial principal ray exiting from the surface (the first exit surface) closest to the image side. By doing so, it is possible to prevent displacement of the axial principal ray on the entrance side due to focusing even if the direction in which the axial principal ray from the object enters the optical system is not coincident with the direction of the axial principal ray exiting from the surface closest to the image side owing to the decentration of the image-forming optical system. It is also possible to effect focusing by moving a plurality of wedge-shaped prisms, which are formed by dividing a plane-parallel plate, in a direction perpendicular to the Z-axis. In this case also, focusing can be performed independently of the decentration of the image-forming optical system.

In the present invention, temperature compensation can be made by forming the prism object-side portion and the prism image-side portion using different materials. By providing these prism portions with powers of different signs, it is possible to prevent the focal shift due to changes in temperature, which is a problem arising when a plastic material is used to form a prism.

In a case where the two prism portions are cemented together in the present invention, it is desirable that each of the two prism portions should have a positioning portion for setting a relative position on a surface having no optical action. In a case where two prism portions each having a reflecting surface with a power are cemented together as in the present invention, in particular, relative displacement of each prism portion causes the performance to be degraded. Therefore, in the present invention, a positioning portion for setting a relative position is provided on each surface of each prism portion that has no optical action, thereby ensuring the required positional accuracy. Thus, the desired performance can be ensured. In particular, if the two prisms are integrated into one unit by using the positioning portions and coupling members, it becomes unnecessary to perform assembly adjustment. Accordingly, the cost can be further reduced.

Furthermore, the optical path can be folded in a direction different from the decentration direction of the image-forming optical system according to the present invention by placing a reflecting optical member, e.g. a mirror, on the object side of the entrance surface of the image-forming optical system. By doing so, the degree of freedom for layout of the image-forming optical system further increases, and the overall size of the image-forming optical apparatus can be further reduced.

In the present invention, the image-forming optical system can be formed from a prism alone. By doing so, the number of components is reduced, and the cost is lowered. Furthermore, two prisms may be integrated into one prism with a stop put therebetween. By doing so, the cost can be further reduced.

In the present invention, the image-forming optical system may include another lens (positive or negative lens) as a constituent element in addition to the prism at either or each of the object and image sides of the prism.

The image-forming optical system according to the present invention may be a fast, single focal length lens system. Alternatively, the image-forming optical system may be arranged in the form of a zoom lens system (variable-magnification image-forming optical system) by combining it with a single or plurality of refracting optical systems that may be provided on the object or image side of the prism or between two prisms.

In the present invention, the refracting and reflecting surfaces of the image-forming optical system may be formed from spherical surfaces or rotationally symmetric aspherical surfaces, as a matter of course.

In the prism of the present invention, reflecting surfaces other than a totally reflecting surface are preferably formed from a reflecting surface having a thin film of a metal, e.g. aluminum or silver, formed on the surface thereof, or a reflecting surface formed from a dielectric multilayer film. In the case of a metal thin film having reflecting action, a high reflectivity can be readily obtained. The use of a dielectric reflecting film is advantageous in a case where a reflecting film having wavelength selectivity or minimal absorption is to be formed.

Thus, it is possible to obtain a low-cost and compact image-forming optical system in which the prism manufacturing accuracy is favorably eased.

In a case where the above-described image-forming optical system according to the present invention is placed in an image pickup part of an image pickup apparatus, or in a case where the image pickup apparatus is a photographic apparatus having a camera mechanism, it is possible to adopt an arrangement in which a prism member is placed closest to the object side among optical elements having an optical action, and the entrance surface of the prism member is decentered with respect to the optical axis, and further a cover member is placed on the object side of the prism member at right angles to the optical axis. The arrangement may also be such that the prism member has on the object side thereof an entrance surface decentered with respect to the optical axis, and a cover lens having a power is placed on the object side of the entrance surface of the prism member in coaxial relation to the optical axis so as to face the entrance surface across an air spacing.

If the prism member is placed closest to the object side and the decentered entrance surface is provided on the front side of a photographic apparatus as stated above, the obliquely tilted entrance surface is seen from the subject, and it gives the illusion that the photographic center of the apparatus is deviated from the subject when the entrance surface is seen from the subject side. Therefore, a cover member or a cover lens is placed at right angles to the optical axis, thereby preventing the subject from feeling incongruous when seeing the entrance surface, and allowing the subject to be photographed with the same feeling as in the case of general photographic apparatus.

A finder optical system can be formed by using any of the above-described image-forming optical systems according to the present invention as a finder objective optical system and adding an image-erecting optical system for erecting an object image formed by the finder objective optical system and an ocular optical system.

In addition, it is possible to construct a camera apparatus by using the finder optical system and an objective optical system for photography provided in parallel to the finder optical system.

In addition, an image pickup optical system can be constructed by using any of the foregoing image-forming optical systems according to the present invention and an image pickup device placed in an image plane formed by the image-forming optical system.

In addition, a camera apparatus can be constructed by using any of the foregoing image-forming optical systems according to the present invention as an objective optical system for photography, and a finder optical system placed in an optical path separate from an optical path of the objective optical system for photography or in an optical path split from the optical path of the objective optical system for photography.

In addition, an electronic camera apparatus can be constructed by using any of the foregoing image-forming optical systems according to the present invention, an image pickup device placed in an image plane formed by the image-forming optical system, a recording medium for recording image information received by the image pickup device, and an image display device that receives image information from the recording medium or the image pickup device to form an image for observation.

In addition, an endoscope system can be constructed by using an observation system having any of the foregoing image-forming optical systems according to the present invention and an image transmitting member for transmitting an image formed by the image-forming optical system along a longitudinal axis, and an illumination system having an illuminating light source and an illuminating light transmitting member for transmitting illuminating light from the illuminating light source along the longitudinal axis.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 8 of the image-forming optical system according to the present invention will be described below. It should be noted that constituent parameters of each example will be shown later.

Figure 1:
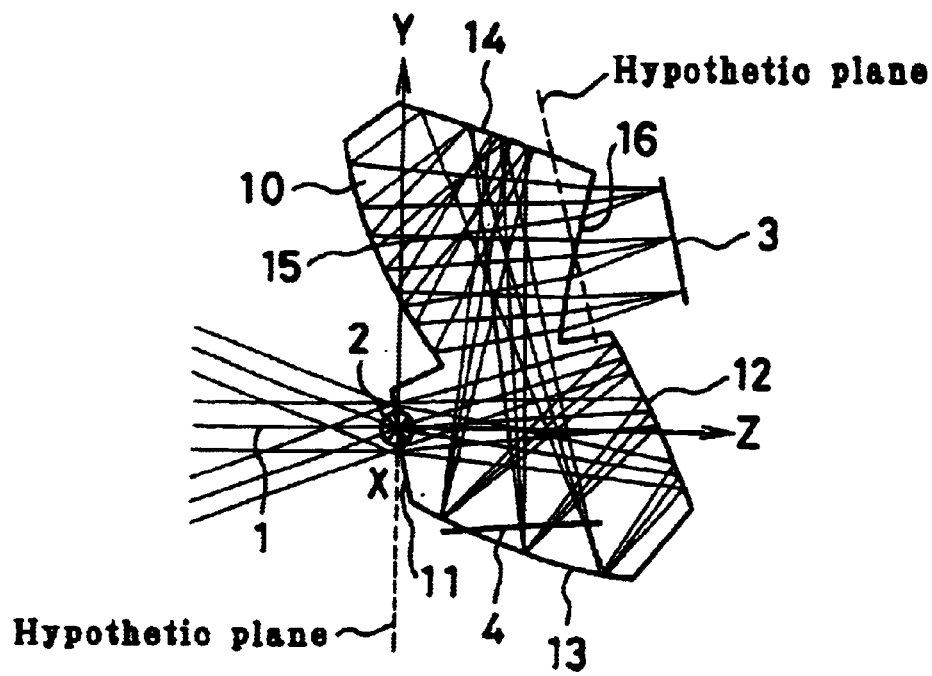
FIG. 1 is a sectional view of an image-forming optical system according to Example 1 of the present invention.

In Examples 1 to 4, as shown in FIG. 1, an axial principal ray 1 is defined by a ray emanating from the center of an object and passing through the center of a stop 2 to reach the center of an image plane 3. A hypothetic plane is taken in a plane extending through the intersection between the axial principal ray 1 and a first entrance surface (first surface) 11 of a prism 10 at right angles to the axial principal ray 1 incident on the first entrance surface 11. Another hypothetic plane is taken in a plane extending through the intersection between the axial principal ray 1 and a first exit surface 16 of the prism 10 at right angles to the axial principal ray 1 exiting from the first exit surface 16. The intersection of each hypothetic plane and the associated optical surface is defined as the origin for decentered optical surfaces present between the optical surface and the hypothetic plane subsequent thereto (the image plane in the case of the final hypothetic plane). In the case of the hypothetic plane determined with respect to the intersection of the entrance surface, a Z-axis is taken in the direction of the axial principal ray 1 incident thereon. In the case of the hypothetic plane determined with respect to the intersection of the exit surface, a Z-axis is taken in the direction of the axial principal ray 1 exiting from the exit surface. With respect to the first hypothetic plane passing through the intersection between the axial principal ray 1 and the first entrance surface (first surface) 11 of the prism 10, a positive direction of the Z-axis is taken in the direction of travel of the axial principal ray 1. With respect to the hypothetic plane regarding the first exit surface 16, a positive direction of the Z-axis is taken in the direction of travel of the axial principal ray 1 in a case where there are an even number of reflections in the optical path from the first hypothetic plane to the hypothetic plane concerned. In a case where the number of reflections is an odd number, a positive direction of the Z-axis is taken in an opposite direction to the direction of travel of the axial principal ray 1. A plane containing the Z-axis and the center of the image plane is defined as a YZ-plane. An axis extending through the origin at right angles to the YZ-plane is defined as an X-axis. The direction in which the X-axis extends from the obverse side toward the reverse side of the plane of the figure is defined as a positive direction of the X-axis. An axis that constitutes a right-handed orthogonal coordinate system in combination with the X- and Z-axes is defined as a Y-axis. FIG. 1 shows the hypothetic planes and a coordinate system concerning the first hypothetic plane determined with respect to the intersection of the first entrance surface 11. Illustration of the hypothetic planes and the coordinate system is omitted in FIGS. 2 to 4.

Figure 5:
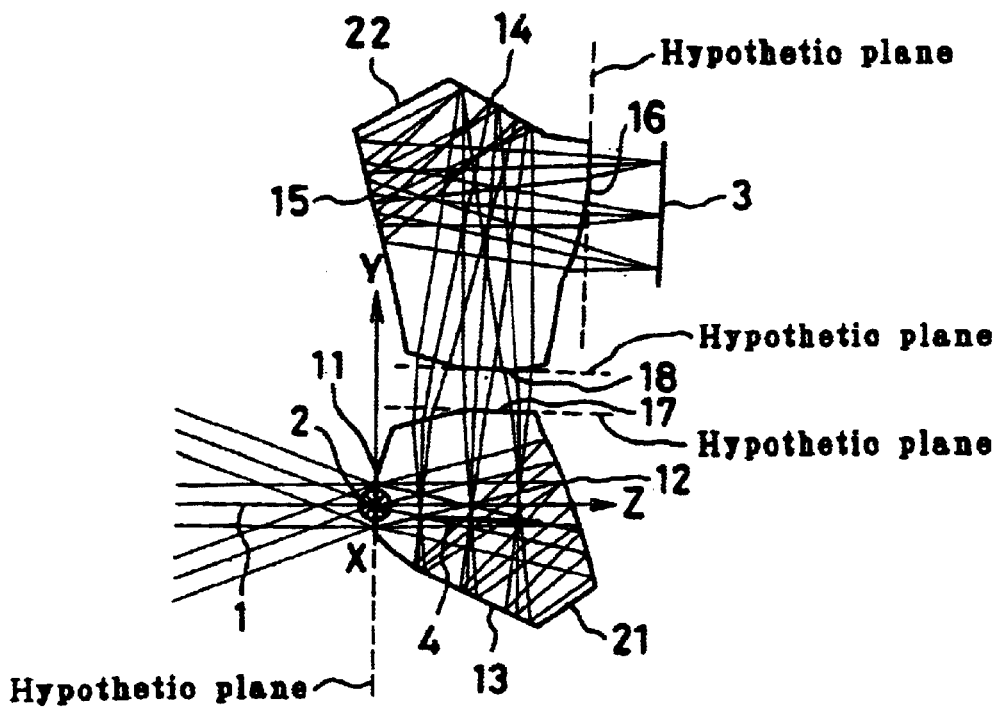
FIG. 5 is a sectional view of an image-forming optical system according to Example 5 of the present invention.

In Examples 5 to 8, as shown in FIG. 5, an axial principal ray 1 is defined by a ray emanating from the center of an object and passing through the center of a stop 2 to reach the center of an image plane 3. A hypothetic plane is taken in a plane extending through the intersection between the axial principal ray 1 and a first entrance surface (first surface) 11 of a first prism 21 at right angles to the axial principal ray 1 incident on the first entrance surface 11. Another hypothetic plane is taken in a plane extending through the intersection between the axial principal ray 1 and an exit surface 17 of the first prism 21 at right angles to the axial principal ray 1 exiting from the exit surface 17. Another hypothetic plane is taken in a plane extending through the intersection between the axial principal ray 1 and an entrance surface 18 of a second prism 22 at right angles to the axial principal ray 1 incident on the entrance surface 18. Another hypothetic plane is taken in a plane extending through the intersection between the axial principal ray 1 and a first exit surface 16 of the second prism 22 at right angles to the axial principal ray 1 exiting from the first exit surface 16. The intersection of each hypothetic plane and the associated optical surface is defined as the origin for decentered optical surfaces present between the optical surface and the hypothetic plane subsequent thereto (the image plane in the case of the final hypothetic plane). In the case of the hypothetic plane determined with respect to the intersection of each entrance surface, a Z-axis is taken in the direction of the axial principal ray 1 incident thereon. In the case of the hypothetic plane determined with respect to the intersection of each exit surface, a Z-axis is taken in the direction of the axial principal ray 1 exiting from the exit surface. With respect to the first hypothetic plane passing through the intersection between the axial principal ray 1 and the first entrance surface (first surface) 11 of the first prism 21, a positive direction of the Z-axis is taken in the direction of travel of the axial principal ray 1. With respect to the other hypothetic planes, a positive direction of the Z-axis is taken in the direction of travel of the axial principal ray 1 in a case where there are an even number of reflections in the optical path from the first hypothetic plane to the hypothetic plane concerned. In a case where the number of reflections is an odd number, a positive direction of the Z-axis is taken in an opposite direction to the direction of travel of the axial principal ray 1. A plane containing the Z-axis and the center of the image plane is defined as a YZ-plane. An axis extending through the origin at right angles to the YZ-plane is defined as an X-axis. The direction in which the X-axis extends from the obverse side toward the reverse side of the plane of the figure is defined as a positive direction of the X-axis. An axis that constitutes a right-handed orthogonal coordinate system in combination with the X- and Z-axes is defined as a Y-axis. FIG. 5 shows the hypothetic planes and a coordinate system concerning the first hypothetic plane determined with respect to the intersection of the first entrance surface 11. Illustration of the hypothetic planes and the coordinate system is omitted in FIGS. 6 to 8.

In Examples 1 to 8, the decentration of each surface is made in the YZ-plane, and the one and only plane of symmetry of each rotationally asymmetric free-form surface is the YZ-plane.

Regarding decentered surfaces, each surface is given displacements in the X-, Y- and Z-axis directions (X, Y and Z, respectively) of the vertex position of the surface from the origin of the associated coordinate system, and tilt angles (degrees) of the center axis of the surface [the Z-axis of the above equation (a) in regard to free-form surfaces] with respect to the X-, Y- and Z-axes ($\alpha$, $\beta$ and $\gamma$, respectively). In this case, the positive $\alpha$ and $\beta$ mean counterclockwise rotation relative to the positive directions of the corresponding axes, and the positive $\gamma$ means clockwise rotation relative to the positive direction of the Z-axis.

Among optical surfaces constituting the optical system in each example, a specific surface (including a hypothetic plane) and a surface subsequent thereto are given a surface separation when these surfaces form a coaxial optical system. In addition, the refractive index and Abbe's number of each medium are given according to the conventional method. It should be noted that the sign of the surface separation is shown to be a positive value in a case where there are an even number of reflections in the optical path from the first hypothetic plane to the reference optical surface (including a hypothetic plane), whereas in a case where the number of reflections is an odd number, the sign of the surface separation is shown to be a negative value. However, the distances in the direction of travel of the axial principal ray 1 are all positive values.

The configuration of each free-form surface used in the present invention is defined by the above equation (a). The Z-axis of the defining equation is the axis of the free-form surface.

In the constituent parameters (shown later), those terms concerning free-form surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), A is the distance from the Z-axis in the XY-plane, and R is the azimuth angle about the Z-axis, which is expressed by the angle of rotation measured from the Z-axis.

$$x = R \times \cos(A) \qquad \text{(b)}$$
$$y = R \times \sin(A)$$
$$Z = D_2 + D_3 R\cos(A) + D_4 R\sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) + D_{18}(5R^5 - 4R^3)\cos(3A) +$$
$$D_{19}(10R^5 - 12R^3 + 3R)\cos(A) + D_{20}(10R^5 - 12R^3 + 3R)\sin(A) +$$
$$D_{21}(5R^5 - 4R^3)\sin(3A) + D_{22} R^5 \sin(5A) + D_{23} R^6 \cos(6A) +$$
$$D_{24}(6R^6 - 5R^4)\cos(4A) + D_{25}(15R^6 - 20R^4 + 6R^2)\cos(2A) +$$

-continued
$$D_{26}(20R^6 - 30R^4 + 12R^2 - 1) + D_{27}(15R^6 - 20R^4 + 6R^2)\sin(2A) +$$
$$D_{28}(6R^6 - 5R^4)\sin(4A) + D_{29} R^6 \sin(6A)$$

To design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

Other examples of surfaces usable in the present invention are expressed by the following defining equation (c):

$$Z = \Sigma\Sigma C_{nm} XY$$

Assuming that k=7 (polynomial of degree 7), for example, a free-form surface is expressed by an expanded form of the above equation as follows:

$$\begin{aligned}Z = {} & C_2 + C_3 y + C_4|x| + C_5 y^2 + C_6 y|x| + C_7 x^2 + C_8 y^3 + \\ & C_9 y^2|x| + C_{10} yx^2 + C_{11}|x^3| + C_{12} y^4 + C_{13} y^3|x| + C_{14} y^2 x^2 + \\ & C_{15} y|x^3| + C_{16} x^4 + C_{17} y^5 + C_{18} y^4 |x| + C_{19} y^3 x^2 + C_{20} y^2 |x^3| + \\ & C_{21} yx^4 + C_{22}|x^5| + C_{23} y^6 + C_{24} y^5 |x| + C_{25} y^4 x^2 + C_{26} y^3 |x^3| + \\ & C_{27} y^2 x^4 + C_{28} y|x^5| + C_{29} x^6 + C_{30} y^7 + C_{31} y^6 |x| + C_{32} y^5 x^2 + \\ & C_{33} y^4 |x^3| + C_{34} y^3 x^4 + C_{35} y^2 |x^5| + C_{36} yx^6 + C_{35}|x^7|\end{aligned}$$ (c)

Although in the examples of the present invention the surface configuration is expressed by a free-form surface using the above equation (a), it should be noted that the same advantageous effect can be obtained by using the above equation (b) or (c).

Figure 3:
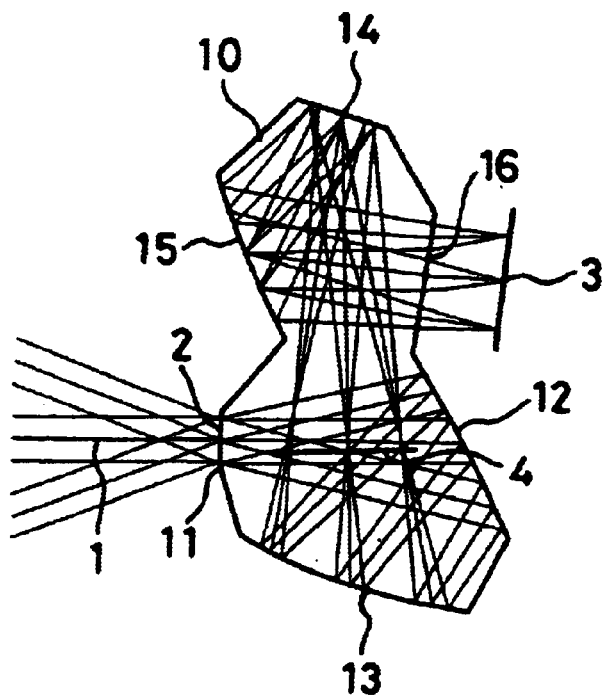
FIG. 3 is a sectional view of an image-forming optical system according to Example 3 of the present invention.

In all Examples 1 to 8, photographic field angles are as follows: The horizontal half field angle is 26.3°, and the vertical half field angle is 20.3°. The image height is 1.6×1.2 millimeters. The entrance pupil diameter is 1.15 millimeters. The focal length is 3.24 millimeters. The F-number is 2.8. The focal length is equivalent to 35 millimeters in terms of the focal length of a silver halide camera. The present invention includes not only an image pickup optical system using the image-forming optical system according to the present invention but also an image pickup apparatus incorporating the optical system. Examples 1 and 3:

FIGS. 1 and 3 are sectional views of Examples 1 and 3 taken along the YZ-plane containing the axial principal ray. Constituent parameters of these examples will be shown later. In the constituent parameters, free-form surfaces are denoted by "FFS", and hypothetic planes by "HRP" (Hypothetic Reference Plane). The same shall apply to the other examples.

Examples 1 and 3 each have, in order in which light passes from the object side, a stop 2, an object-side portion of a prism 10, an image-side portion of the prism 10, and an image plane (image-formation plane) 3. The object-side portion of the prism 10 comprises a first entrance surface 11, a first reflecting surface 12, and a second reflecting surface 13. Light rays are transmitted and reflected by these surfaces in the mentioned order. Rays incident on the first reflecting surface 12 and rays reflected from the second reflecting surface 13 intersect each other in the prism 10. An intermediate image plane 4 produced by the object-side portion is formed behind the second reflecting surface 13 (although FIGS. 1 to 8 formally show that the intermediate image plane 4 passes through the intermediate image points at right angles to the axial principal ray 1, the intermediate image plane 4 actually has a rotationally asymmetric curved configuration passing through the intermediate image points).

The intermediate image plane 4 is formed on the image plane 3 by the image-side portion of the prism 10. The image-side portion of the prism 10 comprises a third reflecting surface 14, a fourth reflecting surface 15, and a first exit surface 16. Light rays are reflected and transmitted by these surfaces in the mentioned order. Rays incident on the third reflecting surface 14 and rays reflected from the fourth reflecting surface 15 intersect each other in the prism 10. In these examples, the direction of rotation of a light beam traveling along a triangular intersecting optical path formed by the first entrance surface 11, the first reflecting surface 12 and the second reflecting surface 13 is opposite to the direction of rotation of a light beam traveling along a triangular intersecting optical path formed by the third reflecting surface 14, the fourth reflecting surface 15 and the first exit surface 16.

Figure 2:
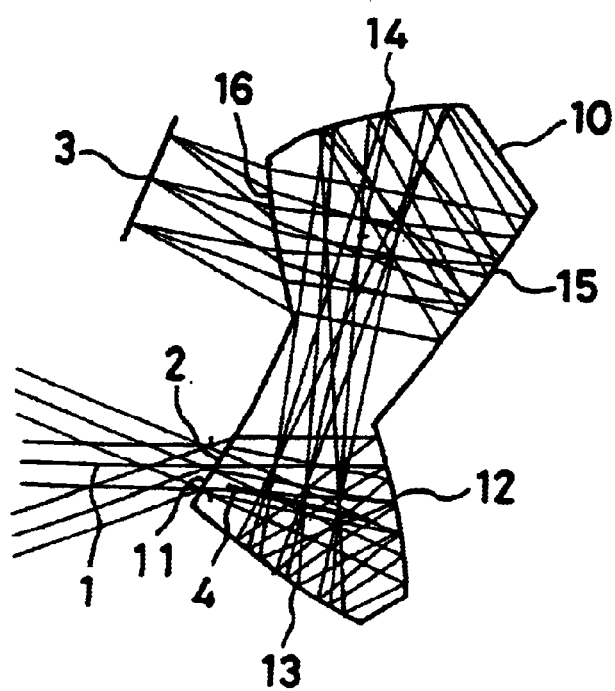
FIG. 2 is a sectional view of an image-forming optical system according to Example 2 of the present invention.
Figure 4:
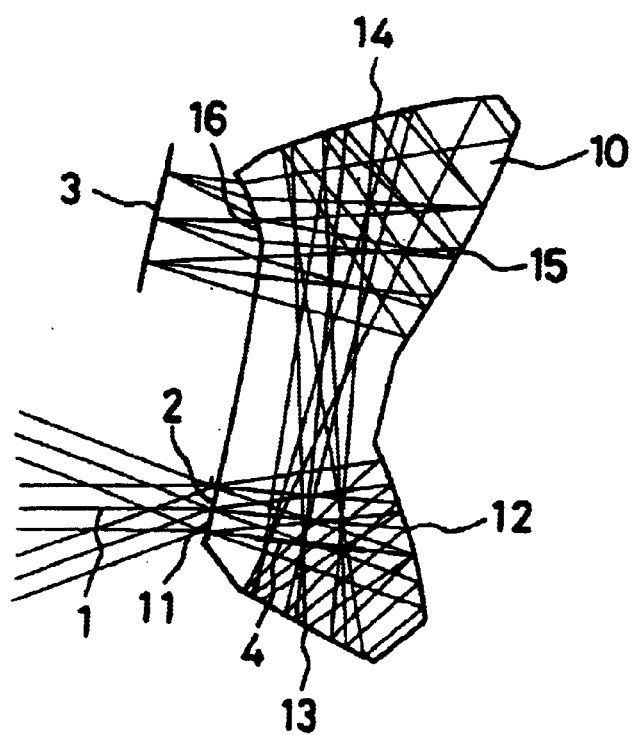
FIG. 4 is a sectional view of an image-forming optical system according to Example 4 of the present invention.

In the constituent parameters (shown later), the displacements of each of the surface Nos. 3 to 9 are expressed by the amounts of displacement from the hypothetic plane 1 of surface No. 2. The image plane is expressed by only the surface separation along the axial principal ray from the hypothetic plane 2 of surface No. 9. Examples 2 and 4:

FIGS. 2 and 4 are sectional views of Examples 2 and 4 taken along the YZ-plane containing the axial principal ray. Constituent parameters of these examples will be shown later.

Examples 2 and 4 each have, in order in which light passes from the object side, a stop 2, an object-side portion of a prism 10, an image-side portion of the prism 10, and an image plane (image-formation plane) 3. The object-side portion of the prism 10 comprises a first entrance surface 11, a first reflecting surface 12, and a second reflecting surface 13. Light rays are transmitted and reflected by these surfaces in the mentioned order. Rays incident on the first reflecting surface 12 and rays reflected from the second reflecting surface 13 intersect each other in the prism 10. An intermediate image plane 4 produced by the object-side portion is formed behind the second reflecting surface 13. The intermediate image plane 4 is formed on the image plane 3 by the image-side portion of the prism 10. The image-side portion of the prism 10 comprises a third reflecting surface 14, a fourth reflecting surface 15, and a first exit surface 16. Light rays are reflected and transmitted by these surfaces in the mentioned order. Rays incident on the third reflecting surface 14 and rays reflected from the fourth reflecting surface 15 intersect each other in the prism 10. In these examples, the direction of rotation of a light beam traveling along a triangular intersecting optical path formed by the first entrance surface 11, the first reflecting surface 12 and the second reflecting surface 13 is the same as the direction of rotation of a light beam traveling along a triangular intersecting optical path formed by the third reflecting surface 14, the fourth reflecting surface 15 and the first exit surface 16.

Figure 7:
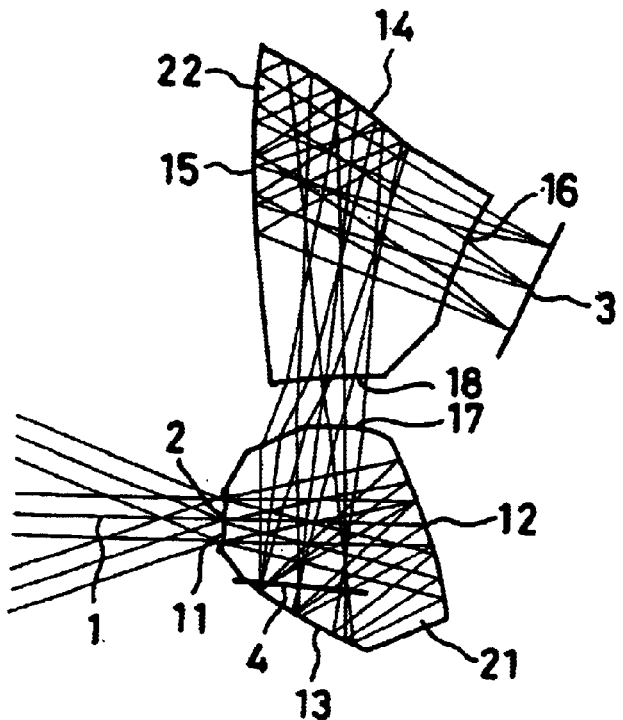
FIG. 7 is a sectional view of an image-forming optical system according to Example 7 of the present invention.

In the constituent parameters (shown later), the displacements of each of the surface Nos. 3 to 9 are expressed by the amounts of displacement from the hypothetic plane 1 of surface No. 2. The image plane is expressed by only the surface separation along the axial principal ray from the hypothetic plane 2 of surface No. 9. Examples 5 and 7:

FIGS. 5 and 7 are sectional views of Examples 5 and 7 taken along the YZ-plane containing the axial principal ray. Constituent parameters of these examples will be shown later.

Examples 5 and 7 each have, in order in which light passes from the object side, a stop 2, a first prism 21, a second prism 22, and an image plane (image-formation plane) 3. The first prism 21 comprises a first entrance surface 11, a first reflecting surface 12, a second reflecting surface 13, and a second exit surface 17. Light rays are transmitted, reflected and transmitted by these surfaces in the mentioned order. Rays incident on the first reflecting surface 12 and rays reflected from the second reflecting surface 13 intersect each other in the first prism 21. An intermediate image plane 4 produced by the first entrance surface 11, the first reflecting surface 12 and the second reflecting surface 13 is formed between the second reflecting surface 13 and the second transmitting surface 17. The intermediate image plane 4 is formed on the image plane 3 by the second transmitting surface 17 and the second prism 22. The second prism 22 comprises a second entrance surface 18, a third reflecting surface 14, a fourth reflecting surface 15, and a first exit surface 16. Light rays are transmitted, reflected and transmitted by these surfaces in the mentioned order. Rays incident on the third reflecting surface 14 and rays reflected from the fourth reflecting surface 15 intersect each other in the second prism 22. In these examples, the direction of rotation of a light beam traveling along a triangular intersecting optical path formed by the first entrance surface 11, the first reflecting surface 12 and the second reflecting surface 13 is opposite to the direction of rotation of a light beam traveling along a triangular intersecting optical path formed by the third reflecting surface 14, the fourth reflecting surface 15 and the first exit surface 16.

In the constituent parameters (shown later), the displacements of each of the surface Nos. 3 to 7 are expressed by the amounts of displacement from the hypothetic plane 1 of surface No. 2. The vertex position of the surface No. 8 (the hypothetic plane 3) is expressed by only the surface separation along the axial principal ray from the hypothetic plane 2 of surface No. 7. The displacements of each of the surface Nos. 9 to 13 are expressed by the amounts of displacement from the hypothetic plane 3 of surface No. 8. The image plane is expressed by only the surface separation along the axial principal ray from the hypothetic plane 4 of surface No. 13.

EXAMPLES 6 and 8

Figure 6:
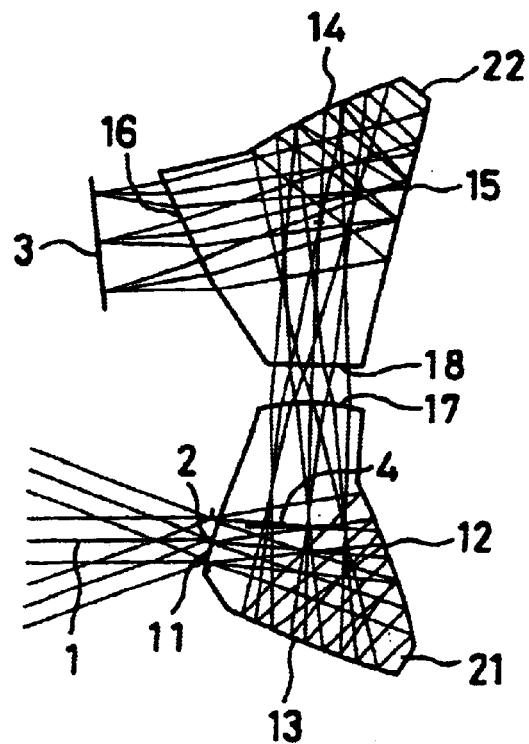
FIG. 6 is a sectional view of an image-forming optical system according to Example 6 of the present invention.
Figure 8:
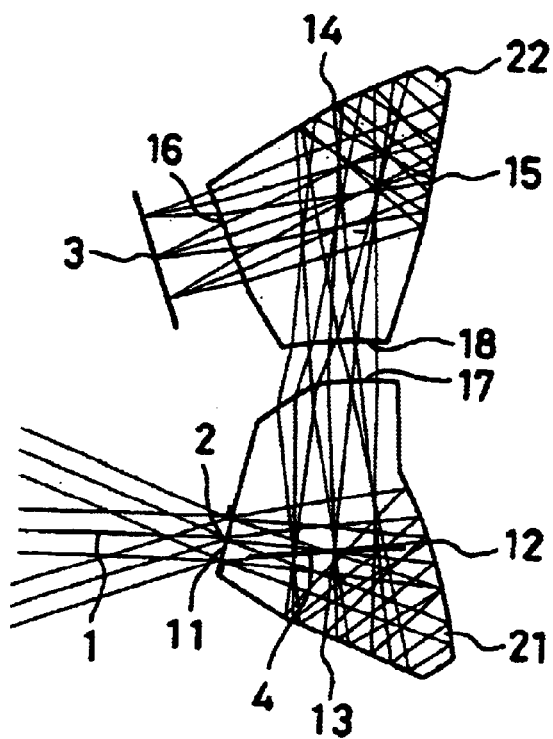
FIG. 8 is a sectional view of an image-forming optical system according to Example 8 of the present invention.

FIGS. 6 and 8 are sectional views of Examples 6 and 8 taken along the YZ-plane containing the axial principal ray. Constituent parameters of these examples will be shown later.

Examples 6 and 8 each have, in order in which light passes from the object side, a stop 2, a first prism 21, a second prism 22, and an image plane (image-formation plane) 3. The first prism 21 comprises a first entrance surface 11, a first reflecting surface 12, a second reflecting surface 13, and a second exit surface 17. Light rays are transmitted, reflected and transmitted by these surfaces in the mentioned order. Rays incident on the first reflecting surface 12 and rays reflected from the second reflecting surface 13 intersect each other in the first prism 21. An intermediate image plane 4 produced by the first entrance surface 11, the first reflecting surface 12 and the second reflecting surface 13 is formed between the second reflecting surface 13 and the second transmitting surface 17. The intermediate image plane 4 is formed on the image plane 3 by the second transmitting surface 17 and the second prism 22. The second prism 22 comprises a second entrance surface 18, a third reflecting surface 14, a fourth reflecting surface 15, and a first exit surface 16. Light rays are transmitted, reflected and transmitted by these surfaces in the mentioned order. Rays incident on the third reflecting surface 14 and rays reflected from the fourth reflecting surface 15 intersect each other in the second prism 22. In these examples, the direction of rotation of a light beam traveling along a triangular intersecting optical path formed by the first entrance surface 11, the first reflecting surface 12 and the second reflecting surface 13 is the same as the direction of rotation of a light beam traveling along a triangular intersecting optical path formed by the third reflecting surface 14, the fourth reflecting surface 15 and the first exit surface 16.

In the constituent parameters (shown later), the displacements of each of the surface Nos. 3 to 7 are expressed by the amounts of displacement from the hypothetic plane 1 of surface No. 2. The vertex position of the surface No. 8 (the hypothetic plane 3) is expressed by only the surface separation along the axial principal ray from the hypothetic plane 2 of surface No. 7. The displacements of each of the surface Nos. 9 to 13 are expressed by the amounts of displacement from the hypothetic plane 3 of surface No. 8. The image plane is expressed by only the surface separation along the axial principal ray from the hypothetic plane 4 of surface No. 13.

Constituent parameters in the foregoing Examples 1 to 8 are shown below. In the tables below, "FFS" denotes a free-form surface, and "HRP" denotes a hypothetic plane.

EXAMPLE 1

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.10 | | | |
| 2 | ∞ (H R P 1) | | | | |
| 3 | F F S ① | | (1) | 1.4924 | 57.6 |
| 4 | F F S ② | | (2) | 1.4924 | 57.6 |
| 5 | F F S ③ | | (3) | 1.4924 | 57.6 |
| 6 | F F S ④ | | (4) | 1.4924 | 57.6 |
| 7 | F F S ⑤ | | (5) | 1.4924 | 57.6 |
| 8 | F F S ⑥ | | (6) | | |
| 9 | ∞ (H R P 2) | 2.60 | (7) | | |
| Image plane | ∞ | | | | |

F F S ①
$C_4$ $1.4745 \times 10^{-1}$  $C_6$  $7.9582 \times 10^{-2}$

F F S ②
$C_4$ $-3.9949 \times 10^{-2}$  $C_6$  $-1.8820 \times 10^{-2}$

F F S ③
$C_4$ $3.7493 \times 10^{-2}$  $C_6$  $3.8549 \times 10^{-2}$

F F S ④
$C_4$ $-7.7376 \times 10^{-3}$  $C_6$  $-7.8124 \times 10^{-3}$

F F S ⑤
$C_4$ $3.9556 \times 10^{-2}$  $C_6$  $3.7486 \times 10^{-2}$

F F S ⑥
$C_4$ $1.8864 \times 10^{-3}$  $C_6$  $1.4064 \times 10^{-2}$

Displacement and tilt (1)
| X | 0.00 | Y | 0.00 | Z | 0.00 |
| α | 13.83 | β | 0.00 | γ | 0.00 |

Displacement and tilt (2)
| X | 0.00 | Y | −1.06 | Z | 6.53 |
| α | 13.29 | β | 0.00 | γ | 0.00 |

Displacement and tilt (3)
| X | 0.00 | Y | −3.99 | Z | 2.47 |
| α | 58.29 | β | 0.00 | γ | 0.00 |

Displacement and tilt (4)
| X | 0.00 | Y | 0.00 | Z | 9.94 |
| α | −22.50 | β | 0.00 | γ | 0.00 |

Displacement and tilt (5)
| X | 0.00 | Y | 3.16 | Z | 6.79 |
| α | −67.50 | β | 0.00 | γ | 0.00 |

Displacement and tilt (6)
| X | 0.00 | Y | −1.73 | Z | 6.79 |
| α | −105.63 | β | 0.00 | γ | 0.00 |

Displacement and tilt (7)
| X | 0.00 | Y | −1.73 | Z | 6.79 |
| α | −81.92 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.10 | | | |
| 2 | ∞ (H R P 1) | | | | |
| 3 | F F S ① | | (1) | 1.4924 | 57.6 |
| 4 | F F S ② | | (2) | 1.4924 | 57.6 |
| 5 | F F S ③ | | (3) | 1.4924 | 57.6 |
| 6 | F F S ④ | | (4) | 1.4924 | 57.6 |
| 7 | F F S ⑤ | | (5) | 1.4924 | 57.6 |
| 8 | F F S ⑥ | | (6) | | |
| 9 | ∞ (H R P 2) | 3.48 | (7) | | |
| Image plane | ∞ | | | | |

F F S ①
$C_4$ $1.1940 \times 10^{-2}$  $C_6$  $-1.0089 \times 10^{-2}$

F F S ②
$C_4$ $-3.9281 \times 10^{-2}$  $C_6$  $-3.8396 \times 10^{-2}$

F F S ③
$C_4$ $2.2247 \times 10^{-2}$  $C_6$  $2.7872 \times 10^{-2}$

F F S ④
$C_4$ $-2.7563 \times 10^{-2}$  $C_6$  $-3.4063 \times 10^{-2}$

F F S ⑤
$C_4$ $2.2540 \times 10^{-2}$  $C_6$  $2.6264 \times 10^{-3}$

F F S ⑥
$C_4$ $-4.4925 \times 10^{-2}$  $C_6$  $-3.3645 \times 10^{-2}$

Displacement and tilt (1)
| X | 0.00 | Y | 0.00 | Z | 0.00 |
| α | −31.21 | β | 0.00 | γ | 0.00 |

Displacement and tilt (2)
| X | 0.00 | Y | 1.69 | Z | 4.55 |
| α | 42.82 | β | 0.00 | γ | 0.00 |

Displacement and tilt (3)
| X | 0.00 | Y | −1.46 | Z | 3.11 |
| α | 87.82 | β | 0.00 | γ | 0.00 |

Displacement and tilt (4)
| X | 0.00 | Y | 0.00 | Z | 10.15 |
| α | 22.50 | β | 0.00 | γ | 0.00 |

Displacement and tilt (5)
| X | 0.00 | Y | −3.49 | Z | 6.66 |
| α | 67.50 | β | 0.00 | γ | 0.00 |

-continued

| | Displacement and tilt (6) | | | | |
|---|---|---|---|---|---|
| X | 0.00 | Y | 2.18 | Z | 6.66 |
| α | 110.74 | β | 0.00 | γ | 0.00 |
| | Displacement and tilt (7) | | | | |
| X | 0.00 | Y | 2.18 | Z | 6.66 |
| α | 78.84 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.10 | | | |
| 2 | ∞ (H R P 1) | | | | |
| 3 | F F S ① | | (1) | 1.4924 | 57.6 |
| 4 | F F S ② | | (2) | 1.4924 | 57.6 |
| 5 | F F S ③ | | (3) | 1.4924 | 57.6 |
| 6 | F F S ④ | | (4) | 1.4924 | 57.6 |
| 7 | F F S ⑤ | | (5) | 1.4924 | 57.6 |
| 8 | F F S ⑥ | | (6) | | |
| 9 | ∞ (H R P 2) | 2.03 | (7) | | |
| Image plane | ∞ | | | | |

F F S ①

$C_4$  $8.5814 \times 10^{-2}$  $C_6$  $9.7753 \times 10^{-3}$  $C_8$  $4.9999 \times 10^{-3}$
$C_{13}$ $-5.7617 \times 10^{-4}$

F F S ②

$C_4$  $-4.0084 \times 10^{-2}$  $C_6$  $-1.4944 \times 10^{-2}$  $C_8$  $1.9913 \times 10^{-3}$
$C_{10}$ $-7.0248 \times 10^{-6}$  $C_{11}$ $6.2670 \times 10^{-4}$  $C_{13}$ $-1.9283 \times 10^{-4}$
$C_{15}$ $-9.5320 \times 10^{-5}$

F F S ③

$C_4$  $1.0574 \times 10^{-2}$  $C_6$  $3.7396 \times 10^{-2}$  $C_8$  $6.2001 \times 10^{-3}$
$C_{10}$ $6.0873 \times 10^{-4}$  $C_{11}$ $4.6910 \times 10^{-4}$  $C_{13}$ $-9.8193 \times 10^{-4}$
$C_{15}$ $-2.9008 \times 10^{-4}$

F F S ④

$C_4$  $-2.8107 \times 10^{-2}$  $C_6$  $-2.1096 \times 10^{-2}$  $C_8$  $3.3309 \times 10^{-4}$
$C_{10}$ $1.2654 \times 10^{-3}$  $C_{11}$ $1.3182 \times 10^{-4}$  $C_{13}$ $5.2249 \times 10^{-4}$
$C_{15}$ $1.8213 \times 10^{-4}$

F F S ⑤

$C_4$  $2.8668 \times 10^{-2}$  $C_6$  $3.3258 \times 10^{-2}$  $C_8$  $-6.3656 \times 10^{-4}$
$C_{10}$ $-4.3304 \times 10^{-4}$  $C_{11}$ $1.7981 \times 10^{-5}$  $C_{13}$ $4.1170 \times 10^{-4}$
$C_{15}$ $1.1474 \times 10^{-4}$

F F S ⑥

$C_4$  $4.5920 \times 10^{-3}$  $C_6$  $3.4434 \times 10^{-3}$  $C_8$  $-2.4885 \times 10^{-2}$
$C_{13}$ $7.8349 \times 10^{-3}$

| | Displacement and tilt (1) | | | | |
|---|---|---|---|---|---|
| X | 0.00 | Y | 0.00 | Z | 0.00 |
| α | 2.31 | β | 0.00 | γ | 0.00 |
| | Displacement and tilt (2) | | | | |
| X | 0.00 | Y | −0.17 | Z | 6.18 |
| α | 25.20 | β | 0.00 | γ | 0.00 |
| | Displacement and tilt (3) | | | | |
| X | 0.00 | Y | −3.90 | Z | 3.25 |
| α | 70.97 | β | 0.00 | γ | 0.00 |
| | Displacement and tilt (4) | | | | |
| X | 0.00 | Y | 0.00 | Z | 8.46 |
| α | −19.10 | β | 0.00 | γ | 0.00 |

-continued

| | Displacement and tilt (5) | | | | |
|---|---|---|---|---|---|
| X | 0.00 | Y | 2.63 | Z | 5.11 |
| α | −68.53 | β | 0.00 | γ | 0.00 |
| | Displacement and tilt (6) | | | | |
| X | 0.00 | Y | −2.08 | Z | 4.38 |
| α | −100.20 | β | 0.00 | γ | 0.00 |
| | Displacement and tilt (7) | | | | |
| X | 0.00 | Y | −2.08 | Z | 4.38 |
| α | −98.20 | β | 0.00 | γ | 0.00 |

EXAMPLE 4

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.10 | | | |
| 2 | ∞ (H R P 1) | | | | |
| 3 | F F S ① | | (1) | 1.4924 | 57.6 |
| 4 | F F S ② | | (2) | 1.4924 | 57.6 |
| 5 | F F S ③ | | (3) | 1.4924 | 57.6 |
| 6 | F F S ④ | | (4) | 1.4924 | 57.6 |
| 7 | F F S ⑤ | | (5) | 1.4924 | 57.6 |
| 8 | F F S ⑥ | | (6) | | |
| 9 | ∞ (H R P 2) | 2.84 | (7) | | |
| Image plane | ∞ | | | | |

F F S ①

$C_4$  $5.0413 \times 10^{-2}$  $C_6$  $-3.7336 \times 10^{-2}$  $C_8$  $4.9418 \times 10^{-2}$
$C_{10}$ $-1.4142 \times 10^{-2}$  $C_{11}$ $1.3334 \times 10^{-2}$  $C_{13}$ $2.3396 \times 10^{-2}$
$C_{15}$ $-1.8589 \times 10^{-4}$

F F S ②

$C_4$  $-4.0862 \times 10^{-2}$  $C_6$  $-3.8025 \times 10^{-2}$  $C_8$  $1.5530 \times 10^{-4}$
$C_{10}$ $-1.3834 \times 10^{-3}$  $C_{11}$ $3.2358 \times 10^{-3}$  $C_{13}$ $-2.4997 \times 10^{-4}$
$C_{15}$ $-1.5955 \times 10^{-4}$

F F S ③

$C_4$  $1.2784 \times 10^{-2}$  $C_6$  $3.6059 \times 10^{-2}$  $C_8$  $7.7983 \times 10^{-3}$
$C_{10}$ $2.9294 \times 10^{-3}$

F F S ④

$C_4$  $-1.6942 \times 10^{-2}$  $C_6$  $-2.7882 \times 10^{-2}$  $C_8$  $-1.8823 \times 10^{-3}$
$C_{10}$ $4.5839 \times 10^{-4}$  $C_{11}$ $1.7036 \times 10^{-4}$  $C_{13}$ $5.5053 \times 10^{-5}$
$C_{15}$ $4.1621 \times 10^{-5}$

F F S ⑤

$C_4$  $3.7553 \times 10^{-2}$  $C_6$  $2.0240 \times 10^{-2}$  $C_8$  $-9.7555 \times 10^{-4}$
$C_{10}$ $1.7498 \times 10^{-3}$  $C_{11}$ $5.4919 \times 10^{-5}$  $C_{13}$ $-4.5536 \times 10^{-5}$
$C_{15}$ $1.2522 \times 10^{-4}$

F F S ⑥

$C_4$  $8.8112 \times 10^{-2}$  $C_6$  $1.2154 \times 10^{-1}$  $C_8$  $-7.5941 \times 10^{-2}$
$C_{10}$ $-5.8052 \times 10^{-3}$  $C_{11}$ $9.6458 \times 10^{-3}$  $C_{13}$ $-2.7619 \times 10^{-3}$
$C_{15}$ $1.4379 \times 10^{-2}$

| | Displacement and tilt (1) | | | | |
|---|---|---|---|---|---|
| X | 0.00 | Y | 0.00 | Z | 0.00 |
| α | −15.02 | β | 0.00 | γ | 0.00 |
| | Displacement and tilt (2) | | | | |
| X | 0.00 | Y | 0.89 | Z | 5.03 |
| α | 32.50 | β | 0.00 | γ | 0.00 |
| | Displacement and tilt (3) | | | | |
| X | 0.00 | Y | −2.26 | Z | 2.83 |
| α | 77.50 | β | 0.00 | γ | 0.00 |

-continued

|  | Displacement and tilt (4) | | | | |
|---|---|---|---|---|---|
| X | 0.00 | Y | 0.00 | Z | 10.89 |
| α | 22.50 | β | 0.00 | γ | 0.00 |
|  | Displacement and tilt (5) | | | | |
| X | 0.00 | Y | −3.21 | Z | 7.68 |
| α | 67.50 | β | 0.00 | γ | 0.00 |
|  | Displacement and tilt (6) | | | | |
| X | 0.00 | Y | 1.90 | Z | 7.68 |
| α | 102.09 | β | 0.00 | γ | 0.00 |
|  | Displacement and tilt (7) | | | | |
| X | 0.00 | Y | 1.90 | Z | 7.68 |
| α | 83.87 | β | 0.00 | γ | 0.00 |

EXAMPLE 5

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.10 | | | |
| 2 | ∞ (H R P 1) | | | | |
| 3 | F F S ① | | (1) | 1.4924 | 57.6 |
| 4 | F F S ② | | (2) | 1.4924 | 57.6 |
| 5 | F F S ③ | | (3) | 1.4924 | 57.6 |
| 6 | F F S ④ | | (4) | | |
| 7 | ∞ (H R P 2) | 1.07 | (5) | | |
| 8 | ∞ (H R P 3) | | | | |
| 9 | F F S ⑤ | | (6) | 1.4924 | 57.6 |
| 10 | F F S ⑥ | | (7) | 1.4924 | 57.6 |
| 11 | F F S ⑦ | | (8) | 1.4924 | 57.6 |
| 12 | F F S ⑧ | | (9) | | |
| 13 | ∞ (H R P 4) | 2.07 | (10) | | |
| Image plane | ∞ | | | | |

|  | FFS ① | | |
|---|---|---|---|
| $C_4$ | $9.9415 \times 10^{-2}$ | $C_6$ | $-1.0251 \times 10^{-2}$ |
|  | FFS ② | | |
| $C_4$ | $-3.1777 \times 10^{-2}$ | $C_6$ | $-4.1381 \times 10^{-2}$ |
|  | FFS ③ | | |
| $C_4$ | $1.0921 \times 10^{-2}$ | $C_6$ | $1.9864 \times 10^{-3}$ |
|  | FFS ④ | | |
| $C_4$ | $-1.3947 \times 10^{-1}$ | $C_6$ | $-8.2631 \times 10^{-2}$ |
|  | FFS ⑤ | | |
| $C_4$ | $-1.7628 \times 10^{-2}$ | $C_6$ | $8.3247 \times 10^{-2}$ |
|  | FFS ⑥ | | |
| $C_4$ | $-1.3188 \times 10^{-2}$ | $C_6$ | $-2.2426 \times 10^{-2}$ |
|  | FFS ⑦ | | |
| $C_4$ | $3.3408 \times 10^{-2}$ | $C_6$ | $1.6172 \times 10^{-2}$ |
|  | FFS ⑧ | | |
| $C_4$ | $-2.0179 \times 10^{-2}$ | $C_6$ | $-7.7184 \times 10^{-2}$ |

|  | Displacement and tilt (1) | | | | |
|---|---|---|---|---|---|
| X | 0.00 | Y | 0.00 | Z | 0.00 |
| α | 0.45 | β | 0.00 | γ | 0.00 |
|  | Displacement and tilt (2) | | | | |
| X | 0.00 | Y | −0.03 | Z | 5.39 |
| α | 19.49 | β | 0.00 | γ | 0.00 |
|  | Displacement and tilt (3) | | | | |
| X | 0.00 | Y | −2.43 | Z | 2.46 |
| α | 63.66 | β | 0.00 | γ | 0.00 |
|  | Displacement and tilt (4) | | | | |
| X | 0.00 | Y | 2.62 | Z | 2.63 |
| α | 93.65 | β | 0.00 | γ | 0.00 |
|  | Displacement and tilt (5) | | | | |
| X | 0.00 | Y | 2.62 | Z | 2.63 |
| α | 85.26 | β | 0.00 | γ | 0.00 |
|  | Displacement and tilt (6) | | | | |
| X | 0.00 | Y | 0.00 | Z | 0.00 |
| α | −0.10 | β | 0.00 | γ | 0.00 |
|  | Displacement and tilt (7) | | | | |
| X | 0.00 | Y | 0.00 | Z | 7.03 |
| α | −26.24 | β | 0.00 | γ | 0.00 |
|  | Displacement and tilt (8) | | | | |
| X | 0.00 | Y | 3.27 | Z | 4.52 |
| α | −71.85 | β | 0.00 | γ | 0.00 |
|  | Displacement and tilt (9) | | | | |
| X | 0.00 | Y | −2.68 | Z | 4.39 |
| α | −97.19 | β | 0.00 | γ | 0.00 |
|  | Displacement and tilt (10) | | | | |
| X | 0.00 | Y | −2.68 | Z | 4.39 |
| α | −88.32 | β | 0.00 | γ | 0.00 |

EXAMPLE 6

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.10 | | | |
| 2 | ∞ (H R P 1) | | | | |
| 3 | F F S ① | | (1) | 1.4924 | 57.6 |
| 4 | F F S ② | | (2) | 1.4924 | 57.6 |
| 5 | F F S ③ | | (3) | 1.4924 | 57.6 |
| 6 | F F S ④ | | (4) | | |
| 7 | ∞ (H R P 2) | 0.97 | (5) | | |
| 8 | ∞ (H R P 3) | | | | |
| 9 | F F S ⑤ | | (6) | 1.4924 | 57.6 |
| 10 | F F S ⑥ | | (7) | 1.4924 | 57.6 |
| 11 | F F S ⑦ | | (8) | 1.4924 | 57.6 |
| 12 | F F S ⑧ | | (9) | | |
| 13 | ∞ (H R P 4) | 2.40 | (10) | | |
| Image plane | ∞ | | | | |

|  | FFS ① | | |
|---|---|---|---|
| $C_4$ | $1.1706 \times 10^{-1}$ | $C_6$ | $-5.6558 \times 10^{-2}$ |
|  | FFS ② | | |
| $C_4$ | $-2.0385 \times 10^{-2}$ | $C_6$ | $-3.1632 \times 10^{-2}$ |
|  | FFS ③ | | |
| $C_4$ | $1.2591 \times 10^{-2}$ | $C_6$ | $2.8642 \times 10^{-2}$ |
|  | FFS ④ | | |
| $C_4$ | $-1.3808 \times 10^{-1}$ | $C_6$ | $-9.3678 \times 10^{-2}$ |
|  | FFS ⑤ | | |
| $C_4$ | $-4.4289 \times 10^{-2}$ | $C_6$ | $3.3935 \times 10^{-2}$ |
|  | FFS ⑥ | | |
| $C_4$ | $-2.1843 \times 10^{-2}$ | $C_6$ | $-3.2128 \times 10^{-2}$ |

-continued

FFS ⑦

| | | | | |
|---|---|---|---|---|
| $C_4$ | $2.0501 \times 10^{-2}$ | $C_6$ | $3.0838 \times 10^{-3}$ | |

FFS ⑧

| | | | | |
|---|---|---|---|---|
| $C_4$ | $-1.1510 \times 10^{-1}$ | $C_6$ | $-1.6756 \times 10^{-3}$ | |

Displacement and tilt (1)

| X | 0.00 | Y | 0.00 | Z | 0.00 |
|---|---|---|---|---|---|
| α | −13.86 | β | 0.00 | γ | 0.00 |

Displacement and tilt (2)

| X | 0.00 | Y | 0.78 | Z | 4.77 |
|---|---|---|---|---|---|
| α | 35.40 | β | 0.00 | γ | 0.00 |

Displacement and tilt (3)

| X | 0.00 | Y | −2.16 | Z | 3.18 |
|---|---|---|---|---|---|
| α | 82.52 | β | 0.00 | γ | 0.00 |

Displacement and tilt (4)

| X | 0.00 | Y | 4.33 | Z | 1.62 |
|---|---|---|---|---|---|
| α | 104.75 | β | 0.00 | γ | 0.00 |

Displacement and tilt (5)

| X | 0.00 | Y | 4.33 | Z | 1.62 |
|---|---|---|---|---|---|
| α | 102.85 | β | 0.00 | γ | 0.00 |

Displacement and tilt (6)

| X | 0.00 | Y | 0.00 | Z | 0.00 |
|---|---|---|---|---|---|
| α | 0.80 | β | 0.00 | γ | 0.00 |

Displacement and tilt (7)

| X | 0.00 | Y | 0.03 | Z | 7.09 |
|---|---|---|---|---|---|
| α | 25.76 | β | 0.00 | γ | 0.00 |

Displacement and tilt (8)

| X | 0.00 | Y | −2.36 | Z | 5.16 |
|---|---|---|---|---|---|
| α | 78.05 | β | 0.00 | γ | 0.00 |

Displacement and tilt (9)

| X | 0.00 | Y | 3.60 | Z | 3.58 |
|---|---|---|---|---|---|
| α | 117.95 | β | 0.00 | γ | 0.00 |

Displacement and tilt (10)

| X | 0.00 | Y | 3.60 | Z | 3.58 |
|---|---|---|---|---|---|
| α | 98.20 | β | 0.00 | γ | 0.00 |

EXAMPLE 7

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.11 | | | |
| 2 | ∞ (HRP 1) | | | | |
| 3 | FFS ① | | (1) | 1.4924 | 57.6 |
| 4 | FFS ② | | (2) | 1.4924 | 57.6 |
| 5 | FFS ③ | | (3) | 1.4924 | 57.6 |
| 6 | FFS ④ | | (4) | | |
| 7 | ∞ (HRP 2) | 1.31 | (5) | | |
| 8 | ∞ (HRP 3) | | | | |
| 9 | FFS ⑤ | | (6) | 1.4924 | 57.6 |
| 10 | FFS ⑥ | | (7) | 1.4924 | 57.6 |
| 11 | FFS ⑦ | | (8) | 1.4924 | 57.6 |
| 12 | FFS ⑧ | | (9) | | |
| 13 | ∞ (HRP 4) | 2.11 | (10) | | |
| Image plane | ∞ | | | | |

FFS ①

| $C_4$ | $7.9718 \times 10^{-2}$ | $C_6$ | $-1.1269 \times 10^{-2}$ | $C_8$ | $-1.0176 \times 10^{-2}$ |
|---|---|---|---|---|---|
| $C_{10}$ | $-2.6805 \times 10^{-2}$ | $C_{11}$ | $1.6790 \times 10^{-3}$ | $C_{13}$ | $1.5078 \times 10^{-3}$ |
| $C_{15}$ | $-6.3750 \times 10^{-3}$ | | | | |

FFS ②

| $C_4$ | $-4.6138 \times 10^{-2}$ | $C_6$ | $-4.8462 \times 10^{-2}$ | $C_8$ | $-4.4935 \times 10^{-5}$ |
|---|---|---|---|---|---|
| $C_{10}$ | $-7.7648 \times 10^{-4}$ | $C_{11}$ | $5.4654 \times 10^{-4}$ | $C_{13}$ | $-2.2718 \times 10^{-4}$ |
| $C_{15}$ | $-1.4747 \times 10^{-4}$ | | | | |

FFS ③

| $C_4$ | $1.3369 \times 10^{-2}$ | $C_6$ | $9.0659 \times 10^{-3}$ | $C_8$ | $9.7824 \times 10^{-3}$ |
|---|---|---|---|---|---|
| $C_{10}$ | $-1.7847 \times 10^{-3}$ | $C_{11}$ | $-1.0220 \times 10^{-3}$ | $C_{13}$ | $-2.0190 \times 10^{-3}$ |
| $C_{15}$ | $-1.2885 \times 10^{-3}$ | | | | |

FFS ④

| $C_4$ | $-1.5289 \times 10^{-1}$ | $C_6$ | $-1.4219 \times 10^{-1}$ | $C_8$ | $5.0554 \times 10^{-3}$ |
|---|---|---|---|---|---|
| $C_{10}$ | $-8.5660 \times 10^{-3}$ | $C_{11}$ | $-1.4963 \times 10^{-3}$ | $C_{13}$ | $8.8480 \times 10^{-4}$ |
| $C_{15}$ | $-7.7840 \times 10^{-4}$ | | | | |

FFS ⑤

| $C_4$ | $-8.6606 \times 10^{-2}$ | $C_6$ | $-3.9618 \times 10^{-2}$ | $C_8$ | $-5.2433 \times 10^{-3}$ |
|---|---|---|---|---|---|
| $C_{10}$ | $-2.0308 \times 10^{-2}$ | $C_{11}$ | $-1.6410 \times 10^{-4}$ | $C_{13}$ | $7.6935 \times 10^{-4}$ |
| $C_{15}$ | $-5.7553 \times 10^{-4}$ | | | | |

FFS ⑥

| $C_4$ | $-1.8763 \times 10^{-2}$ | $C_6$ | $-2.2577 \times 10^{-2}$ | $C_8$ | $-5.4033 \times 10^{-4}$ |
|---|---|---|---|---|---|
| $C_{10}$ | $-3.6774 \times 10^{-4}$ | $C_{11}$ | $5.2947 \times 10^{-5}$ | $C_{13}$ | $-5.7964 \times 10^{-5}$ |
| $C_{15}$ | $-7.9440 \times 10^{-6}$ | | | | |

FFS ⑦

| $C_4$ | $3.1927 \times 10^{-2}$ | $C_6$ | $1.6149 \times 10^{-2}$ | $C_8$ | $-1.5527 \times 10^{-3}$ |
|---|---|---|---|---|---|
| $C_{10}$ | $-9.9188 \times 10^{-4}$ | $C_{11}$ | $6.7759 \times 10^{-6}$ | $C_{13}$ | $-8.4522 \times 10^{-5}$ |
| $C_{15}$ | $1.1927 \times 10^{-5}$ | | | | |

FFS ⑧

| $C_4$ | $8.2308 \times 10^{-2}$ | $C_6$ | $4.6678 \times 10^{-2}$ | $C_8$ | $-2.7504 \times 10^{-2}$ |
|---|---|---|---|---|---|
| $C_{10}$ | $4.9285 \times 10^{-3}$ | $C_{11}$ | $3.1889 \times 10^{-4}$ | $C_{13}$ | $1.4557 \times 10^{-3}$ |
| $C_{15}$ | $6.0455 \times 10^{-3}$ | | | | |

Displacement and tilt (1)

| X | 0.00 | Y | 0.00 | Z | 0.00 |
|---|---|---|---|---|---|
| α | −0.81 | β | 0.00 | γ | 0.00 |

Displacement and tilt (2)

| X | 0.00 | Y | 0.05 | Z | 5.52 |
|---|---|---|---|---|---|
| α | 19.05 | β | 0.00 | γ | 0.00 |

Displacement and tilt (3)

| X | 0.00 | Y | −2.55 | Z | 2.14 |
|---|---|---|---|---|---|
| α | 62.09 | β | 0.00 | γ | 0.00 |

Displacement and tilt (4)

| X | 0.00 | Y | 2.65 | Z | 2.45 |
|---|---|---|---|---|---|
| α | 96.69 | β | 0.00 | γ | 0.00 |

Displacement and tilt (5)

| X | 0.00 | Y | 2.65 | Z | 2.45 |
|---|---|---|---|---|---|
| α | 81.57 | β | 0.00 | γ | 0.00 |

Displacement and tilt (6)

| X | 0.00 | Y | 0.00 | Z | 0.00 |
|---|---|---|---|---|---|
| α | 13.38 | β | 0.00 | γ | 0.00 |

Displacement and tilt (7)

| X | 0.00 | Y | 0.55 | Z | 7.02 |
|---|---|---|---|---|---|
| α | −25.04 | β | 0.00 | γ | 0.00 |

Displacement and tilt (8)

| X | 0.00 | Y | 3.04 | Z | 5.24 |
|---|---|---|---|---|---|
| α | −79.35 | β | 0.00 | γ | 0.00 |

Displacement and tilt (9)

| X | 0.00 | Y | −2.83 | Z | 3.76 |
|---|---|---|---|---|---|
| α | −102.06 | β | 0.00 | γ | 0.00 |

Displacement and tilt (10)

| X | 0.00 | Y | −2.83 | Z | 3.76 |
|---|---|---|---|---|---|
| α | −105.20 | β | 0.00 | γ | 0.00 |

EXAMPLE 8

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.10 | | | |
| 2 | ∞ (H R P 1) | | | | |
| 3 | F F S ① | | (1) | 1.4924 | 57.6 |
| 4 | F F S ② | | (2) | 1.4924 | 57.6 |
| 5 | F F S ③ | | (3) | 1.4924 | 57.6 |
| 6 | F F S ④ | | (4) | | |
| 7 | ∞ (H R P 2) | 1.08 | (5) | | |
| 8 | ∞ (H R P 3) | | | | |
| 9 | F F S ⑤ | | (6) | 1.4924 | 57.6 |
| 10 | F F S ⑥ | | (7) | 1.4924 | 57.6 |
| 11 | F F S ⑦ | | (8) | 1.4924 | 57.6 |
| 12 | F F S ⑧ | | (9) | | |
| 13 | ∞ (H R P 4) | 2.05 | (10) | | |
| Image plane | ∞ | | | | |

F F S ①

$C_4$ $4.6940 \times 10^{-2}$ $C_6$ $-5.4801 \times 10^{-2}$ $C_8$ $2.4076 \times 10^{-2}$
$C_{10}$ $-2.5017 \times 10^{-2}$ $C_{11}$ $7.6467 \times 10^{-3}$ $C_{13}$ $2.4375 \times 10^{-2}$
$C_{15}$ $-2.6368 \times 10^{-3}$

F F S ②

$C_4$ $-3.8851 \times 10^{-2}$ $C_6$ $-4.5014 \times 10^{-2}$ $C_8$ $-2.0800 \times 10^{-4}$
$C_{10}$ $-1.3013 \times 10^{-3}$ $C_{11}$ $-5.5109 \times 10^{-5}$ $C_{13}$ $-4.1175 \times 10^{-5}$
$C_{15}$ $-4.3413 \times 10^{-5}$

F F S ③

$C_4$ $1.5483 \times 10^{-2}$ $C_6$ $5.8148 \times 10^{-3}$ $C_8$ $7.2040 \times 10^{-3}$
$C_{10}$ $-1.0978 \times 10^{-3}$ $C_{11}$ $-2.5074 \times 10^{-4}$ $C_{13}$ $7.1064 \times 10^{-4}$
$C_{15}$ $-4.0019 \times 10^{-4}$

F F S ④

$C_4$ $-4.2258 \times 10^{-2}$ $C_6$ $-1.6036 \times 10^{-1}$ $C_8$ $-4.3143 \times 10^{-2}$
$C_{10}$ $-2.0643 \times 10^{-4}$ $C_{11}$ $2.9217 \times 10^{-3}$ $C_{13}$ $2.9462 \times 10^{-3}$
$C_{15}$ $-7.6527 \times 10^{-4}$

F F S ⑤

$C_4$ $-4.9187 \times 10^{-2}$ $C_6$ $-8.3739 \times 10^{-2}$ $C_8$ $-4.6136 \times 10^{-2}$
$C_{10}$ $-2.3379 \times 10^{-2}$ $C_{11}$ $1.6330 \times 10^{-4}$ $C_{13}$ $-3.2823 \times 10^{-3}$
$C_{15}$ $1.2878 \times 10^{-3}$

F F S ⑥

$C_4$ $-2.7971 \times 10^{-2}$ $C_6$ $-2.9992 \times 10^{-2}$ $C_8$ $-1.1174 \times 10^{-3}$
$C_{10}$ $-1.3738 \times 10^{-5}$ $C_{11}$ $9.6373 \times 10^{-5}$ $C_{13}$ $3.9779 \times 10^{-5}$
$C_{15}$ $3.1647 \times 10^{-5}$

F F S ⑦

$C_4$ $2.8295 \times 10^{-2}$ $C_6$ $9.2540 \times 10^{-3}$ $C_8$ $9.1533 \times 10^{-4}$
$C_{10}$ $1.2919 \times 10^{-3}$ $C_{11}$ $6.1071 \times 10^{-5}$ $C_{13}$ $-5.1722 \times 10^{-5}$
$C_{15}$ $1.6654 \times 10^{-4}$

F F S ⑧

$C_4$ $1.2536 \times 10^{-1}$ $C_6$ $6.8961 \times 10^{-3}$ $C_8$ $-7.0960 \times 10^{-2}$
$C_{10}$ $-8.5531 \times 10^{-3}$ $C_{11}$ $2.4529 \times 10^{-2}$ $C_{13}$ $-9.8519 \times 10^{-3}$
$C_{15}$ $3.0143 \times 10^{-4}$ Displacement and tilt (1)

| X | 0.00 | Y | 0.00 | Z | 0.00 |
| α | −11.36 | β | 0.00 | γ | 0.00 |

Displacement and tilt (2)

| X | 0.00 | Y | 0.74 | Z | 5.54 |
| α | 30.35 | β | 0.00 | γ | 0.00 |

Displacement and tilt (3)

| X | 0.00 | Y | −1.96 | Z | 3.51 |
| α | 79.66 | β | 0.00 | γ | 0.00 |

Displacement and tilt (4)

| X | 0.00 | Y | 4.73 | Z | 1.56 |
| α | 117.16 | β | 0.00 | γ | 0.00 |

Displacement and tilt (5)

| X | 0.00 | Y | 4.73 | Z | 1.56 |
| α | 100.69 | β | 0.00 | γ | 0.00 |

Displacement and tilt (6)

| X | 0.00 | Y | 0.00 | Z | 0.00 |
| α | 4.88 | β | 0.00 | γ | 0.00 |

Displacement and tilt (7)

| X | 0.00 | Y | 0.18 | Z | 6.51 |
| α | 29.22 | β | 0.00 | γ | 0.00 |

Displacement and tilt (8)

| X | 0.00 | Y | −2.40 | Z | 4.82 |
| α | 84.33 | β | 0.00 | γ | 0.00 |

Displacement and tilt (9)

| X | 0.00 | Y | 2.98 | Z | 2.66 |
| α | 113.54 | β | 0.00 | γ | 0.00 |

Displacement and tilt (10)

| X | 0.00 | Y | 2.98 | Z | 2.66 |
| α | 111.00 | β | 0.00 | γ | 0.00 |

Figure 9:
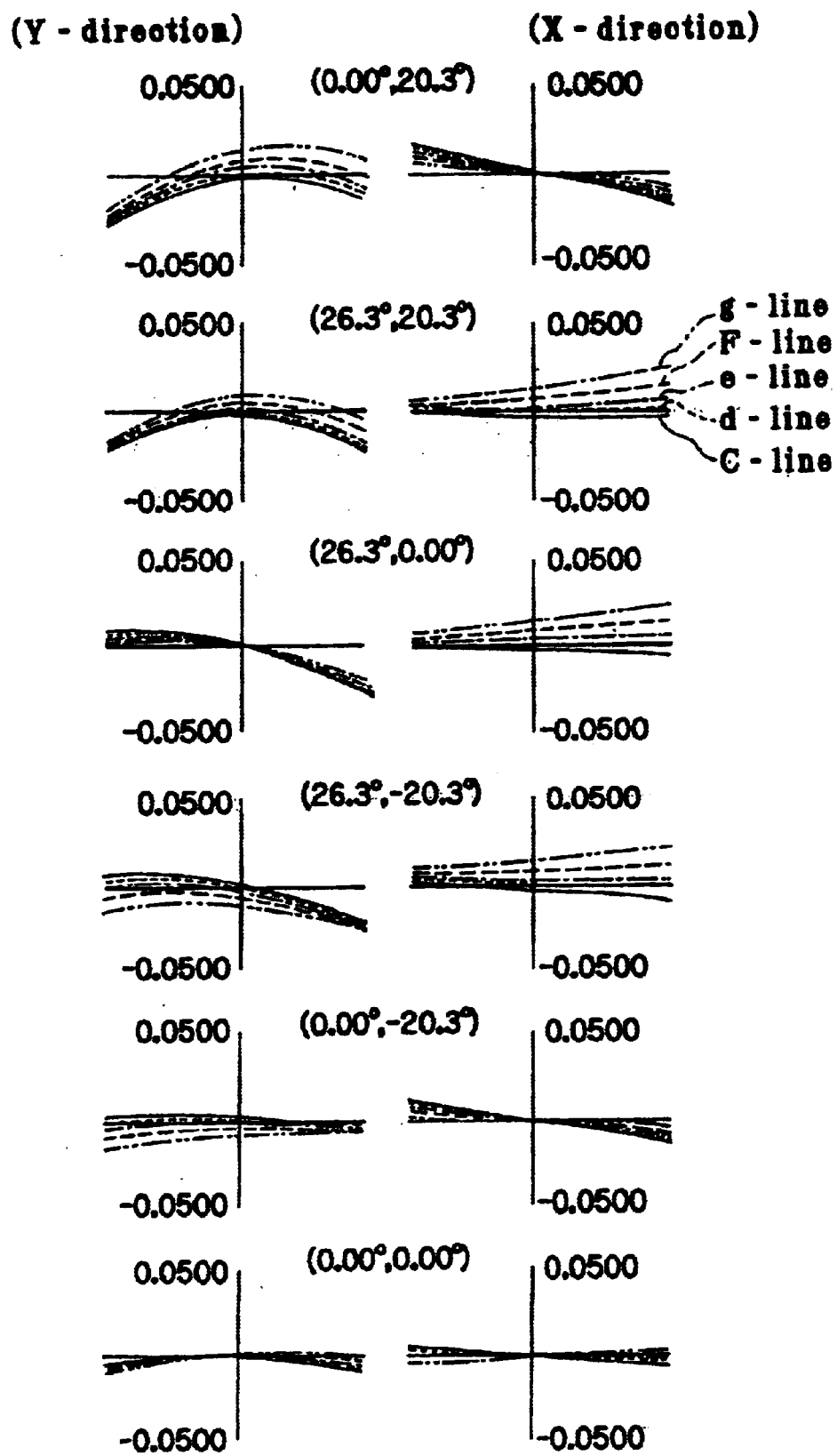
FIG. 9 is an aberrational diagram showing lateral aberrations in the image-forming optical system according to Example 1.

FIG. 9 is an aberrational diagram showing lateral aberrations in the above-described Example 1. In the diagram showing lateral aberrations, the numerals in the parentheses denote (horizontal (X-direction) field angle, vertical (Y-direction) field angle), and lateral aberrations at the field angles are shown.

It should be noted that the values of the conditions (1) to (4) in the above-described Examples 1 to 8 are as follows:

| | Examples | | | | | | | |
|---|---|---|---|---|---|---|---|---|
| Conditions | 1 | 2 | 3 | 4 | 5 | 6 | 7 | 8 |
| (1) | 0.86 | 0.87 | 0.77 | 0.80 | 0.71 | 0.47 | 0.90 | 0.77 |
| (2) | 0.80 | 0.49 | 0.20 | 0.25 | 0.24 | 0.29 | 0.26 | 0.30 |
| (3) | 0.17 | 0.61 | 0.54 | 0.33 | 0.30 | 0.50 | 0.37 | 0.55 |
| (4) | 0.99 | 0.81 | 1.33 | 0.61 | 0.59 | 0.68 | 0.83 | 0.93 |

Incidentally, the above-described image-forming optical system according to the present invention can be used in photographic apparatus, particularly in cameras, in which an object image formed by the image-forming optical system is received with an image pickup device, such as a CCD or a silver halide film, to take a photograph of the object. It is also possible to use the image-forming optical system as an objective optical system of an observation apparatus in which an object image is viewed through an ocular lens, particularly a finder unit of a camera. The image-forming optical system according to the present invention is also usable as an image pickup optical system for optical apparatus using a small-sized image pickup device, e.g. endoscopes. Embodiments in which the present invention is applied to such apparatuses will be described below.

Figure 10:
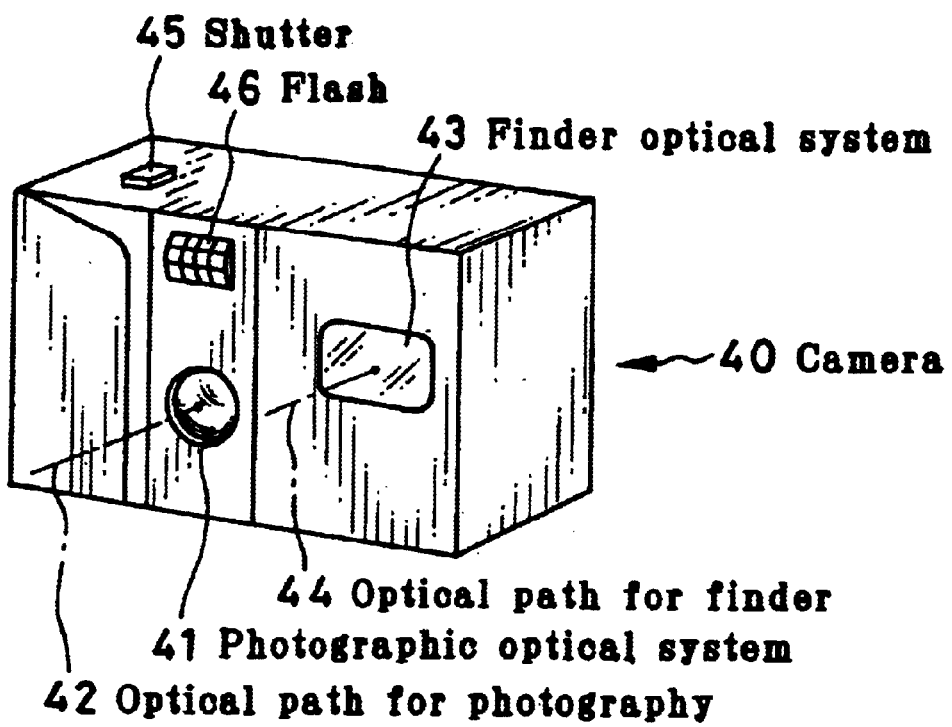
FIG. 10 is a perspective view showing the external appearance of an electronic camera to which an image-forming optical system according to the present invention is applied, as viewed from the front side thereof.
Figure 11:
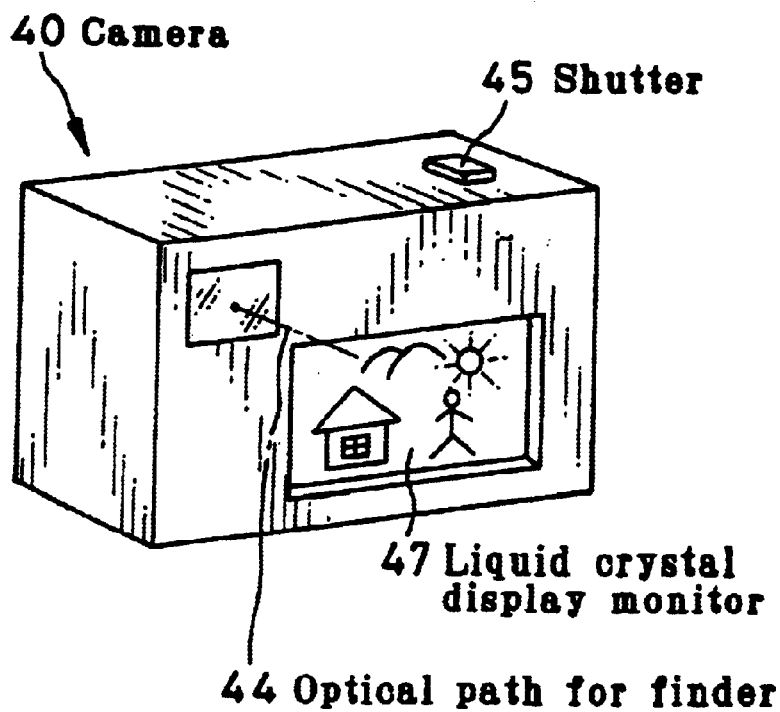
FIG. 11 is a perspective view of the electronic camera shown in FIG. 10, as viewed from the rear side thereof.
Figure 12:
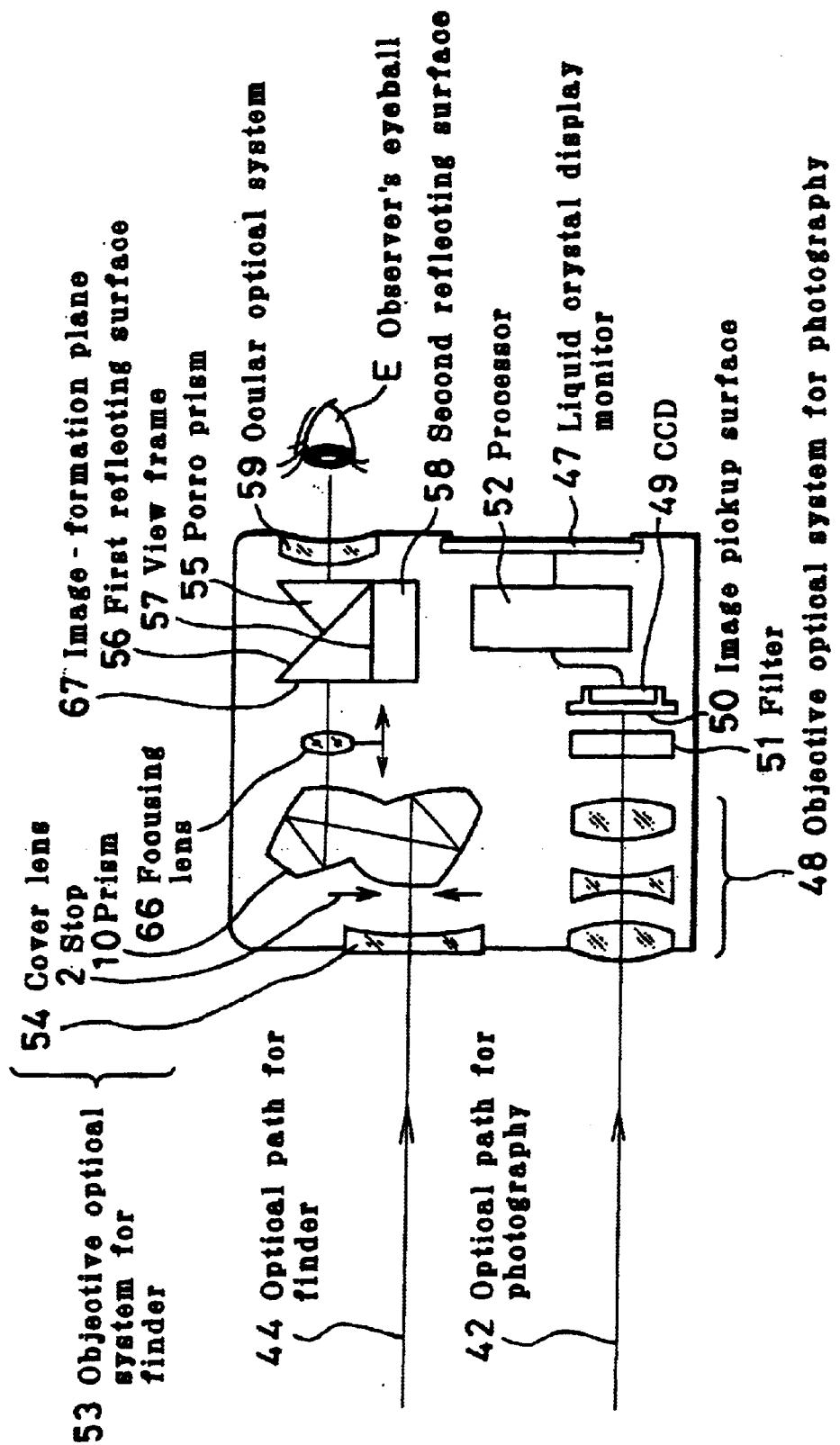
FIG. 12 is a sectional view showing the arrangement of the electronic camera in FIG. 10.

FIGS. 10 to 12 are conceptual views showing an arrangement in which the image-forming optical system according to the present invention is incorporated into an objective optical system in a finder unit of an electronic camera. FIG. 10 is a perspective view showing the external appearance of an electronic camera 40 as viewed from the front side thereof. FIG. 11 is a perspective view of the electronic camera 40 as viewed from the rear side thereof. FIG. 12 is a sectional view showing the arrangement of the electronic camera 40. In the illustrated example, the electronic camera 40 includes a photographic optical system 41 having an optical path 42 for photography, a finder optical system 43 having an optical path 44 for the finder, a shutter 45, a flash 46, a liquid crystal display monitor 47, etc. When the shutter 45, which is placed on the top of the camera 40, is depressed, photography is performed through an objective optical system 48 for photography. An object image produced by the objective optical system 48 for photography is formed on an image pickup surface 50 of a CCD 49 through a filter 51, e.g. a low-pass filter, an infrared cutoff filter, etc. The object image received by the CCD 49 is processed in a processor 52 and displayed as an electronic image on the liquid crystal display monitor 47, which is provided on the rear of the camera 40. The processor 52 is provided with a memory or the like to enable the photographed electronic image to be recorded. It should be noted that the memory may be provided separately from the processor 52. The arrangement may also be such that the photographed electronic image is electronically recorded or written on a floppy disk or the like. The camera 40 may be arranged in the form of a silver halide camera in which a silver halide film is disposed in place of the CCD 49.

Furthermore, an objective optical system 53 for the finder is placed in the optical path 44 for the finder. The objective optical system 53 for the finder comprises a cover lens 54, a stop 2, a prism 10 and a focusing lens 66. The stop 2 and the prism 10 constitute an image-forming optical system. An optical system of the same type as Example 1 is used as the image-forming optical system. The cover lens 54 used as a cover member is a lens having a negative power to enlarge the field angle. The focusing lens 66, which is placed behind the prism 10, can be moved in the forward and backward directions along the optical axis to adjust the position thereof. The focusing lens 66 is used for focusing the objective optical system 53 for the finder. An object image produced on an image-formation plane 67 by the objective optical system 53 for the finder is formed on a view frame 57 of a Porro prism 55, which is an image-erecting member. It should be noted that the view frame 57 is placed between a first reflecting surface 56 and second reflecting surface 58 of the Porro prism 55. An ocular optical system 59 is placed behind the Porro prism 55 to lead an erect image to an observer's eyeball E.

In the camera 40, which is arranged as stated above, the objective optical system 53 for the finder can be constructed with a minimal number of optical members. Accordingly, a high-performance and low-cost camera can be realized. In addition, because the optical path of the objective optical system 53 can be folded, the degree of freedom with which the constituent elements can be arranged in the camera increases. This is favorable for design.

Although no mention is made of the arrangement of the objective optical system 48 for photography in the electronic camera 40 shown in FIG. 12, it should be noted that the objective optical system 48 for photography may be formed by using not only a refracting coaxial optical system but also any type of image-forming optical systems according to the present invention, which comprise a single prism 10 or two prisms 21 and 22.

Figure 13:
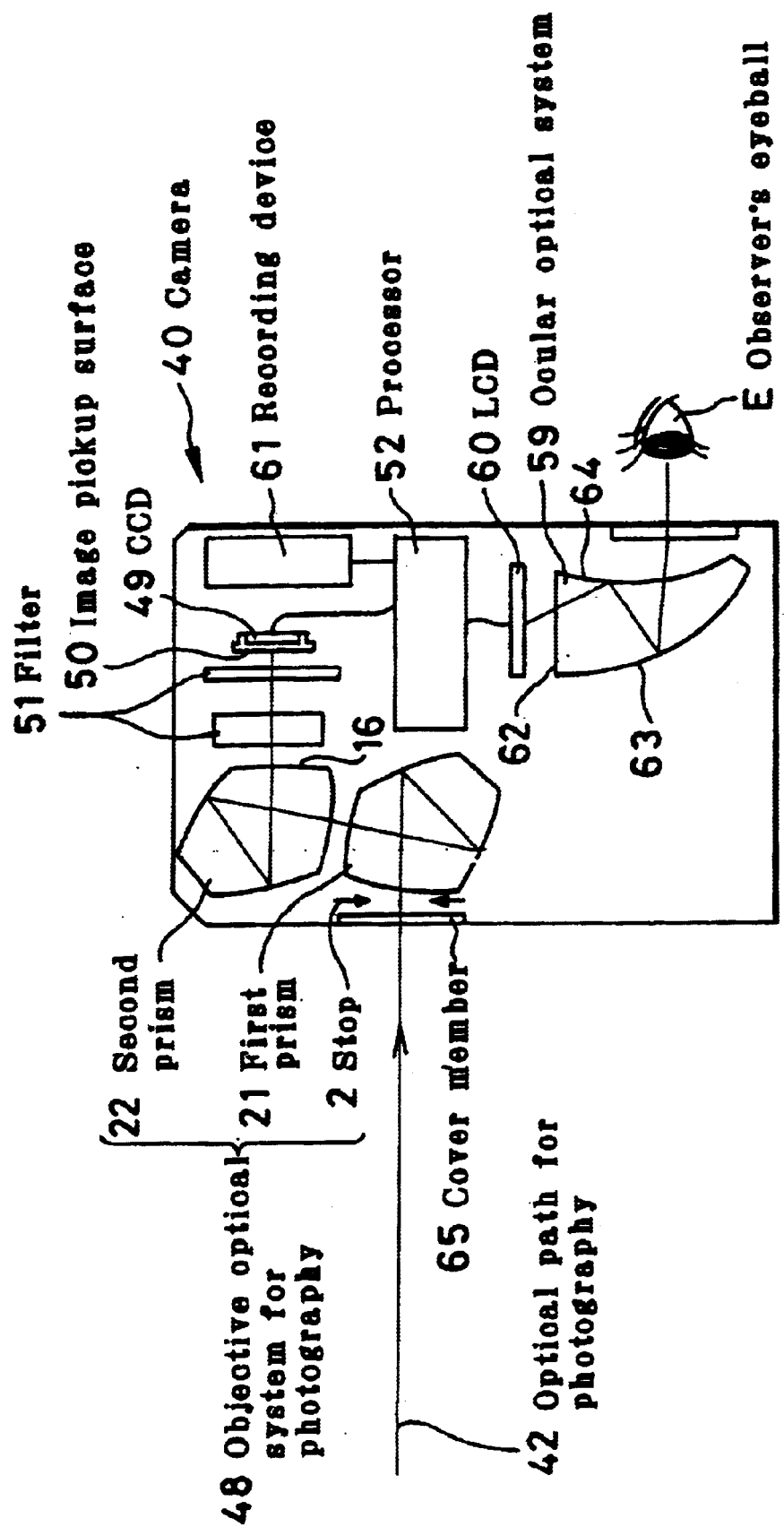
FIG. 13 is a conceptual view of another electronic camera to which an image-forming optical system according to the present invention is applied.

FIG. 13 is a conceptual view showing an arrangement in which an image-forming optical system according to the present invention is incorporated into an objective optical system 48 in a photography part of an electronic camera 40. In this example, an image-forming optical system similar to Example 5 is used in the objective optical system 48 for photography, which is placed in an optical path 42 for photography. An object image produced by the objective optical system for photography is formed on an image pickup surface 50 of a CCD 49 through a filter 51, e.g. a low-pass filter, an infrared cutoff filter, etc. The object image received by the CCD 49 is processed in a processor 52 and displayed in the form of an electronic image on a liquid crystal display device (LCD) 60. The processor 52 also controls a recording device 61 for recording the object image detected by the CCD 49 in the form of electronic information. The image displayed on the LCD 60 is led to an observer's eyeball E through an ocular optical system 59. The ocular optical system 59 is formed from a decentered prism. In this example, the ocular optical system 59 has three surfaces, i.e. an entrance surface 62, a reflecting surface 63, and a surface 64 serving as both reflecting and refracting surfaces. At least one of the two surfaces 63 and 64 having a reflecting action, preferably each of them, is formed from a plane-symmetry free-form surface with only one plane of symmetry that gives a power to a light beam and corrects decentration aberrations. The only one plane of symmetry is formed in approximately the same plane as the only one plane of symmetry of the plane-symmetry free-form surfaces of the prisms 21 and 22 in the objective optical system 48 for photography. The objective optical system 48 for photography may include another lens (positive or negative lens) as a constituent element on the object or image side of the prisms 21 and 22 or therebetween.

In the camera 40 arranged as stated above, the objective optical system 48 for photography can be constructed with a minimal number of optical members. Accordingly, a high-performance and low-cost camera can be realized. In addition, because all the constituent elements of the optical system can be arranged in the same plane, it is possible to reduce the thickness in a direction perpendicular to the plane in which the constituent elements are arranged.

Although in this example a plane-parallel plate is placed as a cover member 65 of the objective optical system 48 for photography, it is also possible to use a lens having a power as the cover member 65 as in the case of the above-described example.

The surface closest to the object side in the image-forming optical system according to the present invention may be used as a cover member instead of providing a cover member separately. In this example, the entrance surface of the prism 10 is the closest to the object side in the image-forming optical system. In such a case, however, because the entrance surface is decentered with respect to the optical axis, if this surface is placed on the front side of the camera, it gives the illusion that the photographic center of the camera 40 is deviated from the subject when the entrance surface is seen from the subject side (the subject normally feels that photographing is being performed in a direction perpendicular to the entrance surface, as in the case of ordinary cameras). Thus, the entrance surface would give a sense of incongruity. Therefore, in a case where the surface of the image-forming optical system that is closest to the object side is a decentered surface as in this example, it is desirable to provide the cover member 65 (or cover lens 54) from the viewpoint of preventing the subject from feeling incongruous when seeing the entrance surface, and allowing the subject to be photographed with the same feeling as in the case of the existing cameras.

Figure 14:
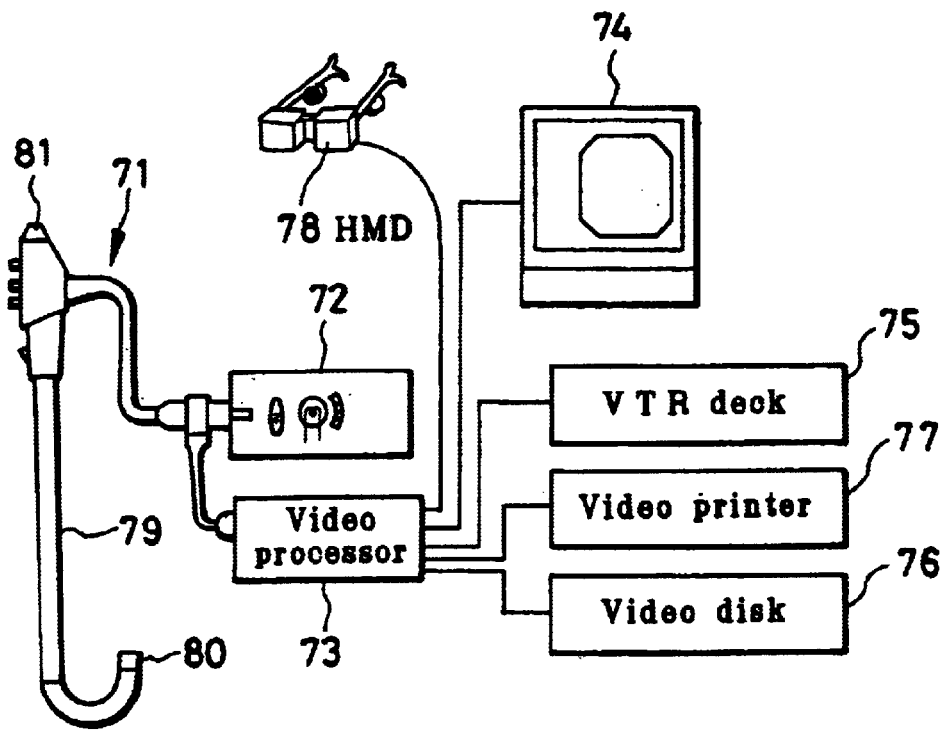
FIG. 14 is a conceptual view of a video endoscope system to which an image-forming optical system according to the present invention is applied.
Figure 14:
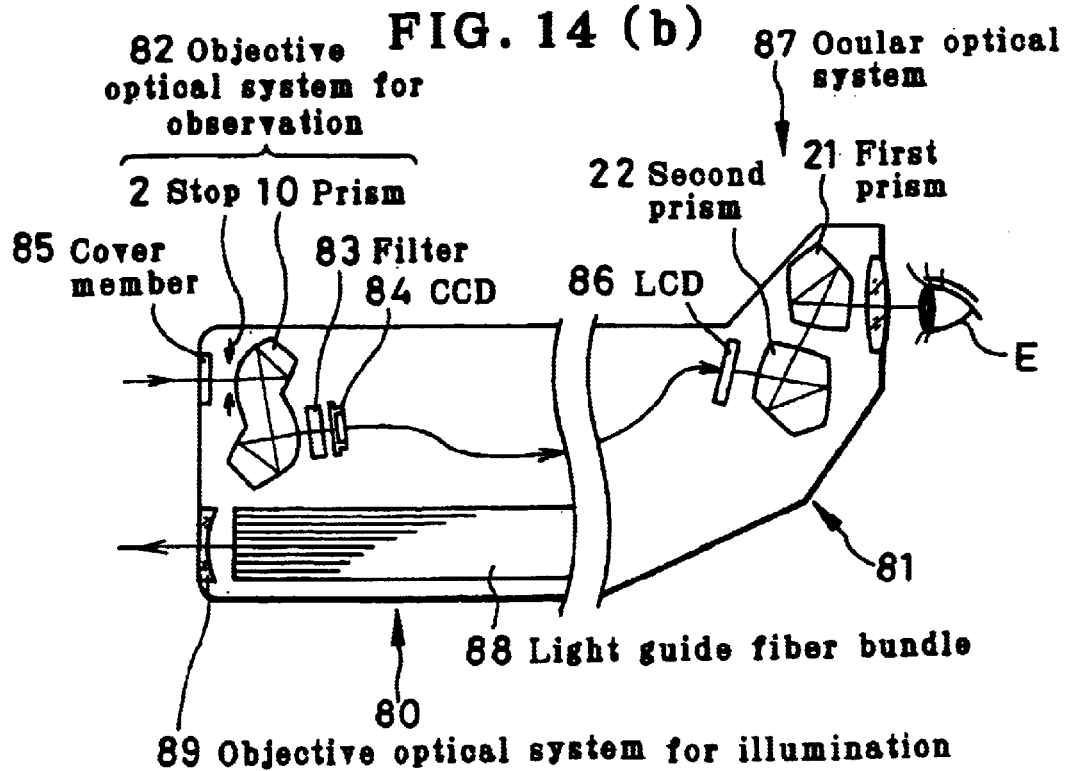

FIG. 14 is a conceptual view showing an arrangement in which the image-forming optical system according to the present invention is incorporated into an objective optical system 82 in an observation system of a video endoscope system, and the image-forming optical system according to the present invention is also incorporated into an ocular optical system 87 in the observation system of the video endoscope system. In this example, the objective optical system 82 in the observation system uses an optical system similar to Example 1, and the ocular optical system 87 uses an optical system similar to Example 5. As shown in part (a) of FIG. 14, the video endoscope system includes a video endoscope 71, a light source unit 72 for supplying illuminating light, a video processor 73 for executing processing of signals associated with the video endoscope 71, a monitor 74 for displaying video signals output from the video processor 73, a VTR deck 75 and a video disk 76, which are connected to the video processor 73 to record video signals and so forth, and a video printer 77 for printing out video signals in the form of images. The video endoscope system further includes a head-mounted image display apparatus (HMD) 78. The video endoscope 71 has an insert part 79 with a distal end portion 80 and an eyepiece part 81. The distal end portion 80 and the eyepiece part 81 are arranged as shown in part (b) of FIG. 14. A light beam from the light source unit 72 passes through a light guide fiber bundle 88 and illuminates a part to be observed through an objective optical system 89 for illumination. Light from the part to be observed enters the objective optical system 82 for observation through a cover member 85. Thus, an object image is formed by the objective optical system 82. The object image is formed on the image pickup surface of a CCD 84 through a filter 83, e.g. a low-pass filter, an infrared cutoff filter, etc. Furthermore, the object image is converted into a video signal by the CCD 84. The video signal is displayed directly on the monitor 74 by the video processor 73, which is shown in part (a) of FIG. 14. In addition, the video signal is recorded in the VTR deck 75 and on the video disk 76 and also printed out in the form of an image from the video printer 77. In addition, the object image is displayed on the image display device of the HMD 78, thereby allowing a person wearing the HMD 78 to observe the displayed image. At the same time, the video signal converted by the CCD 84 is displayed in the form of an electronic image on a liquid crystal display device (LCD) 86 in the eyepiece part 81. The displayed image is led to an observer's eyeball E through the ocular optical system 87, which is formed from a viewing optical system according to the present invention.

The endoscope arranged as stated above can be constructed with a minimal number of optical members. Accordingly, a high-performance and low-cost endoscope can be realized. Moreover, because the constituent elements of the objective optical system 82 are arranged in series in the direction of the longitudinal axis of the endoscope, the above-described advantageous effects can be obtained without hindering the achievement of a reduction in the diameter of the endoscope.

Figure 15:
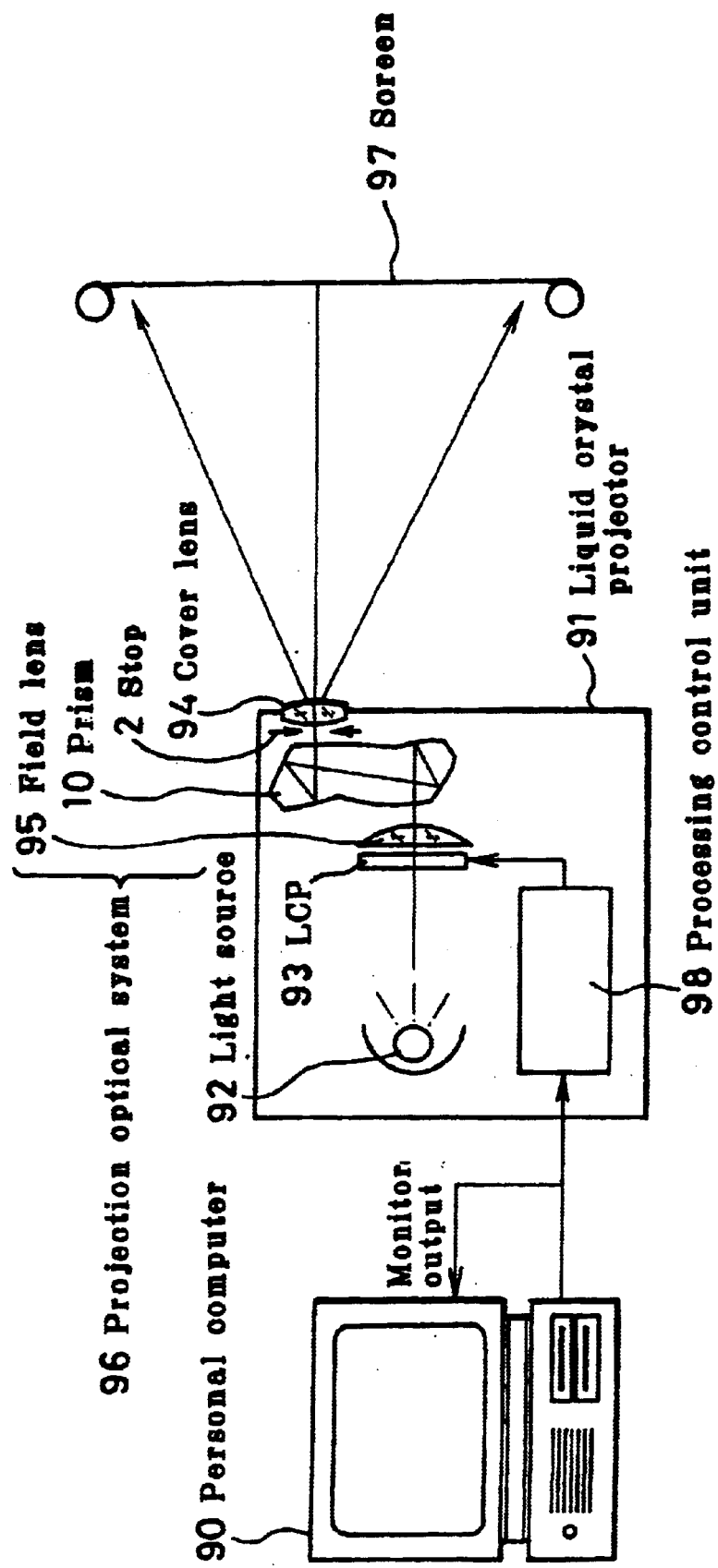
FIG. 15 is a conceptual view showing an arrangement in which a prism optical system according to the present invention is applied to a projection optical system of a presentation system.

Incidentally, the image-forming optical system can also be used as a projection optical system by reversing the optical path. FIG. 15 is a conceptual view showing an arrangement in which a prism optical system according to the present invention is used in a projection optical system 96 of a presentation system formed by combining together a personal computer 90 and a liquid crystal projector 91. In this example, an image-forming optical system similar to Example 1 except that the optical path is reverse to that in Example 1 is used in the projection optical system 96. Referring to FIG. 15, image and manuscript data prepared on the personal computer 90 is branched from a monitor output and delivered to a processing control unit 98 in the liquid crystal projector 91. In the processing control unit 98 of the liquid crystal projector 91, the input data is processed and output to a liquid crystal panel (LCP) 93. The liquid crystal panel 93 displays an image corresponding to the input image data. Light from a light source 92 is applied to the liquid crystal panel 93. The amount of light transmitted by the liquid crystal panel 93 is determined by the gradation of the image displayed on the liquid crystal panel 93. Light from the liquid crystal panel 93 is projected on a screen 97 through a projection optical system 96 comprising a field lens 95 placed immediately in front of the liquid crystal panel 93, a prism 10 constituting the image-forming optical system according to the present invention, and a cover lens 94 which is a positive lens.

The projector arranged as stated above can be constructed with a minimal number of optical members. Accordingly, a high-performance and low-cost projector can be realized. In addition, the projector can be constructed in a compact form.

Figure 16:
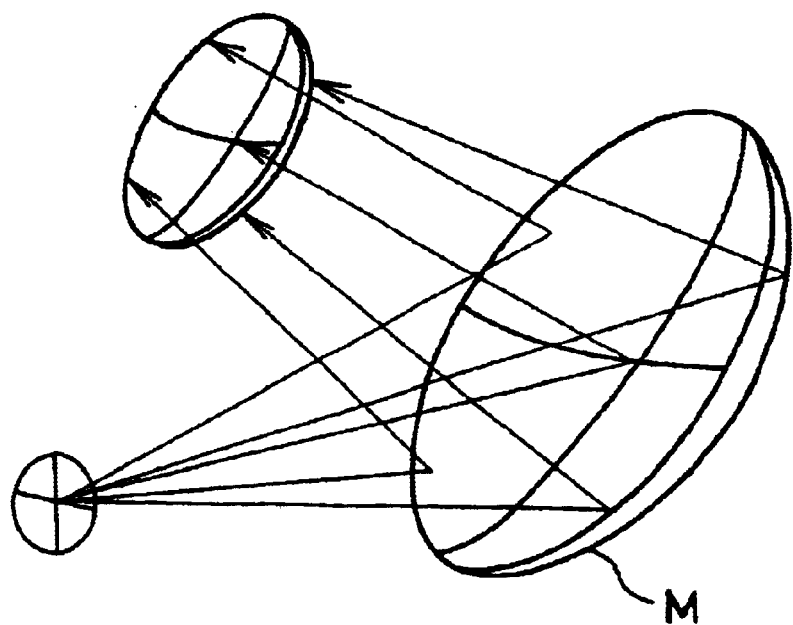
FIG. 16 is a diagram showing a desirable arrangement for an image-forming optical system according to the present invention when it is placed in front of an image pickup device.
Figure 17:
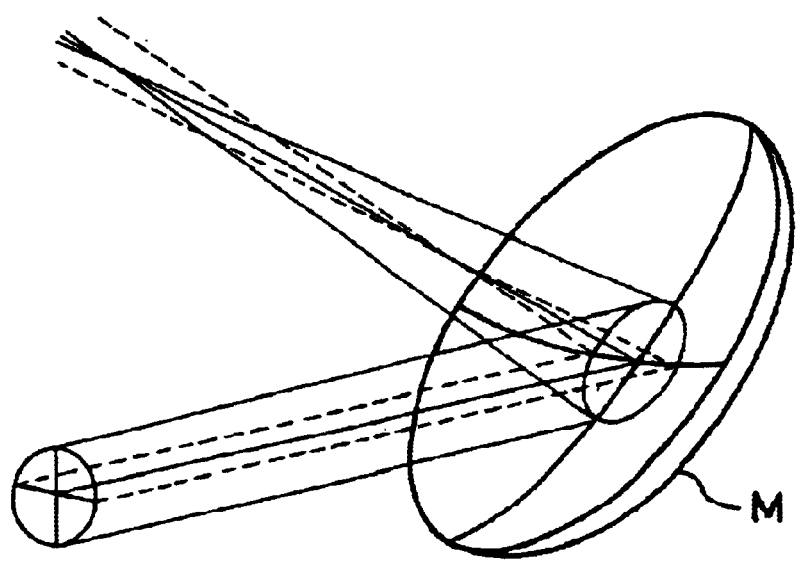
FIG. 17 is a conceptual view for describing curvature of field produced by a decentered reflecting surface.
Figure 18:
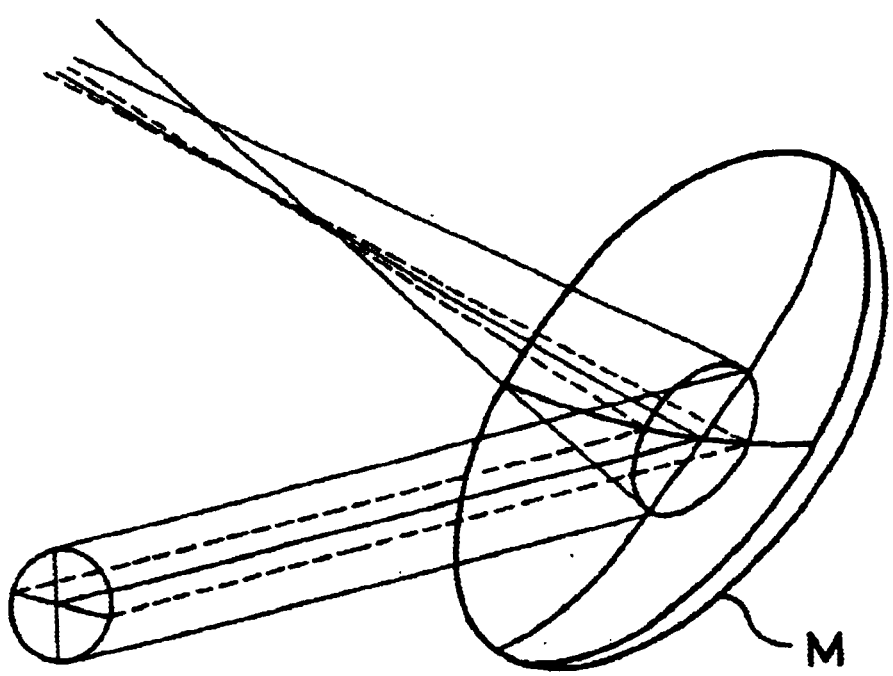
FIG. 18 is a conceptual view for describing astigmatism produced by a decentered reflecting surface.
Figure 19:
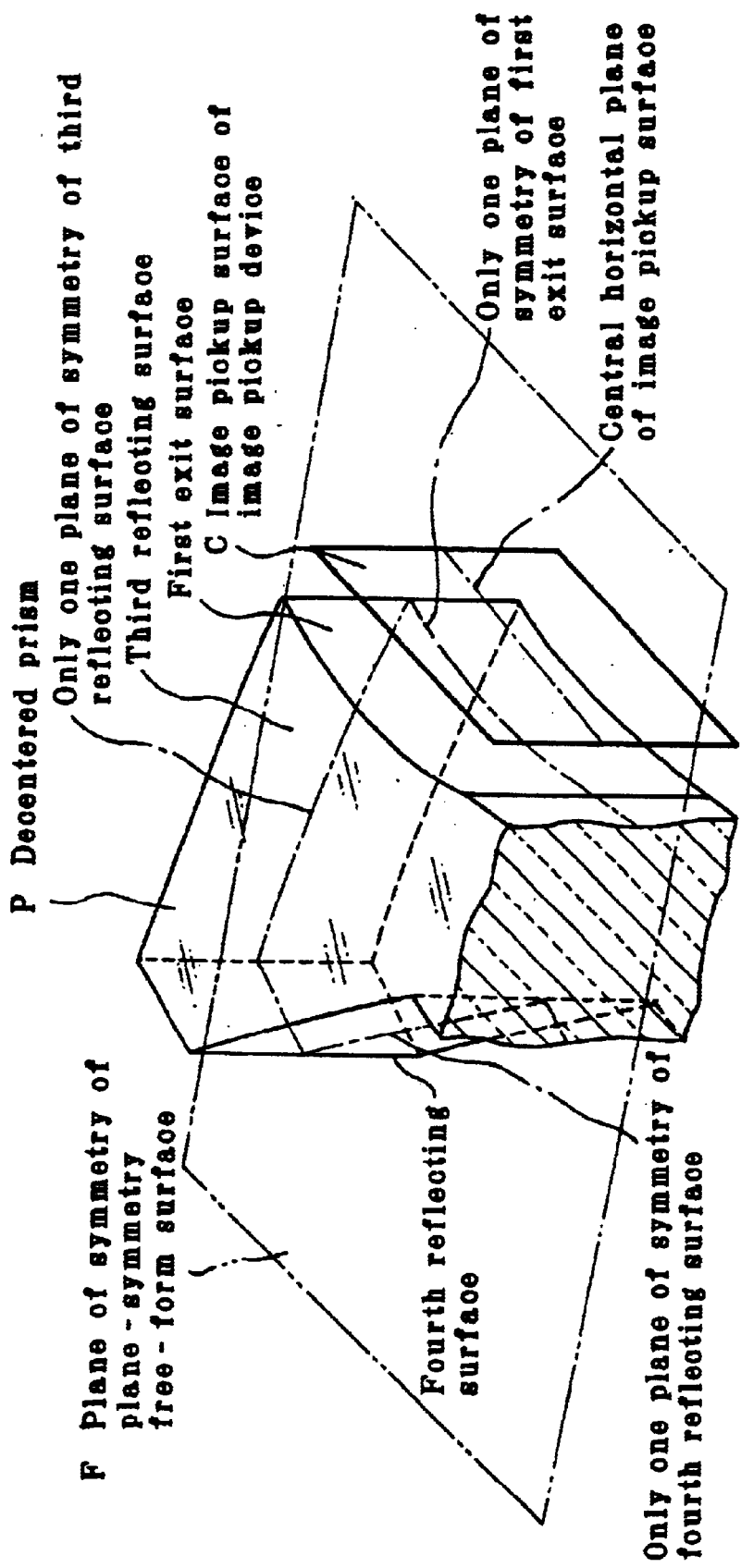
FIG. 19 is a conceptual view for describing coma produced by a decentered reflecting surface.
Figure 20:
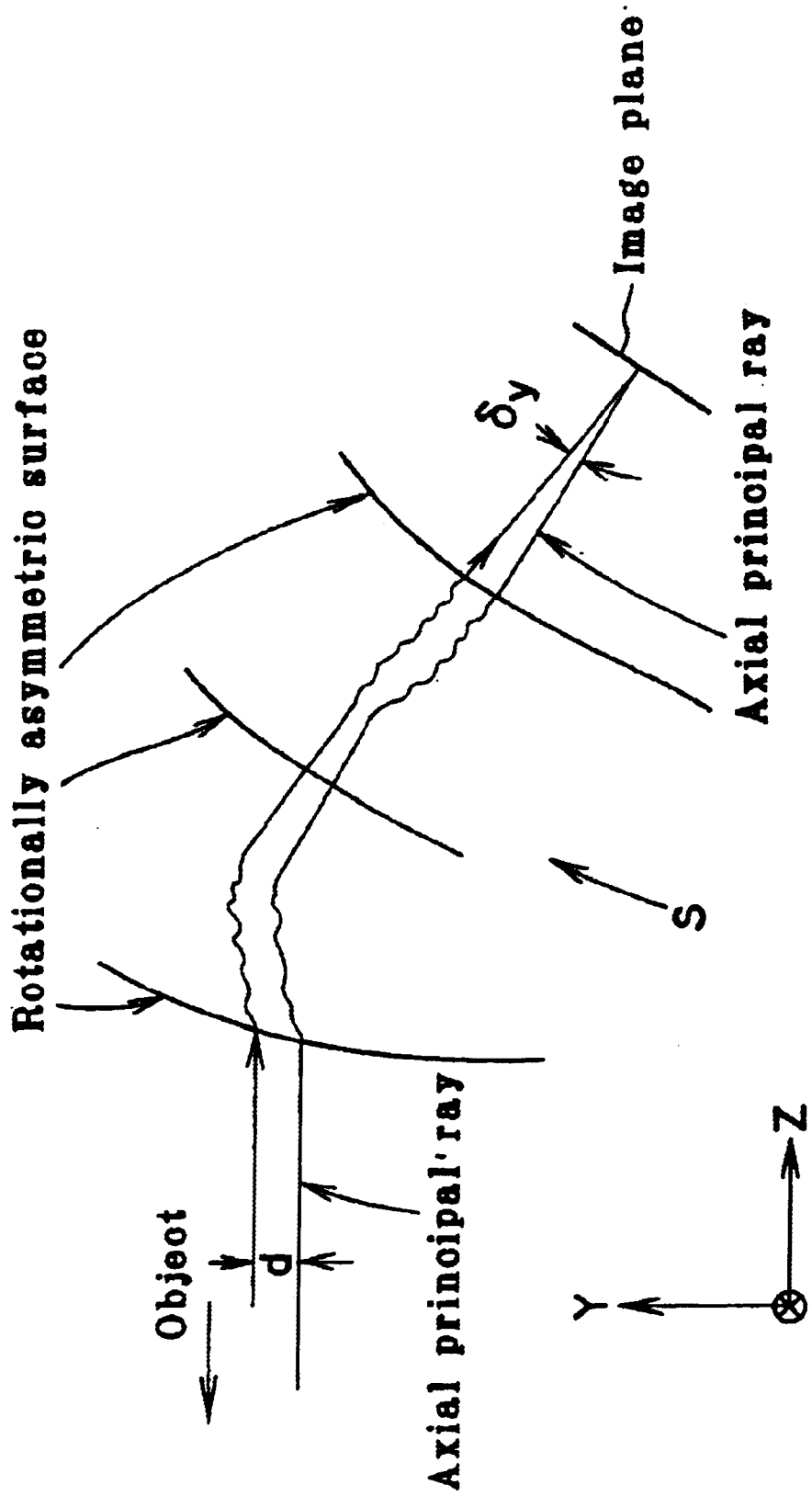
FIG. 20 is a diagram for describing the definition of the power of a decentered optical system and the power of a decentered optical surface.

FIG. 16 shows a desirable arrangement for the image-forming optical system according to the present invention when the image-forming optical system is placed in front of an image pickup device, e.g. a CCD, or a filter. In the figure, a decentered prism P is the image-side portion of a prism member or a second prism included in the image-forming optical system according to the present invention. When the image pickup surface C of an image pickup device forms a quadrangle as shown in the figure, it is desirable from the viewpoint of forming a beautiful image to place the decentered prism P so that the plane F of symmetry of a plane-symmetry free-form surface provided in the decentered prism P is parallel to at least one of the sides forming the quadrangular image pickup surface C.

When the image pickup surface C has a shape in which each of the four interior angles is approximately 90 degrees, such as a square or a rectangle, it is desirable that the plane F of symmetry of the plane-symmetry free-form surface should be parallel to two sides of the image pickup surface C that are parallel to each other. It is more desirable that the plane F of symmetry should lie at the middle between the two parallel sides and coincide with a position where the image pickup surface C is in a symmetry between the right and left halves or between the upper and lower halves. The described arrangement enables the required assembly accuracy to be readily obtained when the image-forming optical system is incorporated into an apparatus, and is useful for mass-production.

When a plurality or all of the optical surfaces constituting the decentered prism P, i.e. the third reflecting surface, the fourth reflecting surface, and the first exit surface, are plane-symmetry free-form surfaces, it is desirable from the viewpoint of design and aberration correcting performance to arrange the decentered prism P so that the planes of symmetry of the plurality or all of the optical surfaces are in the same plane F. In addition, it is desirable that the plane F of symmetry and the image pickup surface C should be in the above-described relationship.

As will be clear from the foregoing description, the present invention makes it possible to provide a high-performance and low-cost image-forming optical system with a minimal number of constituent optical elements. In addition, it is possible to provide a high-performance image-forming optical system that is made compact and thin by folding an optical path using reflecting surfaces arranged to minimize the number of reflections.

I claim:

1. An image-forming optical system having positive refracting power as a whole for forming an object image, said image-forming optical system comprising:

a first prism member formed from a medium having a refractive index (n) larger than 1 (n>1): and
a second prism member formed from a medium having a refractive index (n) larger than 1 (n>1);
said first prism member comprising:
 a first entrance surface through which a light beam from an object enters said first prism member;
 a first reflecting surface and a second reflecting surface, which reflect said light beam within said first prism member; and
 a first prism exit surface through which said light beam exits said first prism member;
said second prism member comprising:
 a second prism entrance surface through which the light beam from said first prism member enters said second prism member;
 a third reflecting surface and a fourth reflecting surface; and
 a first exit surface through which said light beam exits said second prism member;
wherein said first prism exit surface and said second prism entrance surface are positioned to face each other across an air spacing,
wherein said first prism member forms first intersecting optical paths in which an optical path connecting said second reflecting surface and said first prism exit surface intersects an optical path connecting said first entrance surface and said first reflecting surface,
wherein said second prism member forms second intersecting optical paths in which an optical path connecting said second prism entrance surface and said third reflecting surface intersects an optical path connecting said fourth reflecting surface and said first exit surface,
wherein at least one of said first reflecting surface and said second reflecting surface has a curved surface configuration that gives a power to the light beam, said curved surface configuration being a rotationally asymmetric surface configuration that corrects aberrations due to decentration,
wherein at least one of said third reflecting surface and said fourth reflecting surface has a curved surface configuration that gives a power to the light beam, said curved surface configuration being a rotationally asymmetric surface configuration that corrects aberrations due to decentration,
wherein said first prism member and said second prism member are arranged to form an intermediate image plane in an optical path between said second reflecting surface and said third reflecting surface, and
wherein said first entrance surface has a curved surface configuration that gives a power to the light beam, said curved surface configuration being a rotationally asymmetric surface configuration that corrects aberrations due to decentration.

2. An image-forming optical system having positive refracting power as a whole for forming an object image, said image-forming optical system comprising:
a first prism member formed from a medium having a refractive index (n) larger than 1 (n>1); and
a second prism member formed from a medium having a refractive index (n) larger than 1 (n>1);
said first prism member comprising:
 a first entrance surface through which a light beam from an object enters said first prism member;
 a first reflecting surface and a second reflecting surface, which reflect said light beam within said first prism member; and
 a first prism exit surface through which said light beam exits said first prism member;
said second prism member comprising:
 a second prism entrance surface through which the light beam from said first prism member enters said second prism member;
 a third reflecting surface and a fourth reflecting surface; and
 a first exit surface through which said light beam exits said second prism member,
wherein said first prism exit surface and said second prism entrance surface are positioned to face each other across an air spacing,
wherein said first prism member forms first intersecting optical paths in which an optical path connecting said second reflecting surface and said first prism exit surface intersects an optical path connecting said first entrance surface and said first reflecting surface,
wherein said second prism member forms second intersecting optical paths in which an optical path connecting said second prism entrance surface and said third reflecting surface intersects an optical path connecting said fourth reflecting surface and said first exit surface,
wherein at least one of said first reflecting surface and said second reflecting surface has a curved surface configuration that gives a power to the light beam, said curved surface configuration being a rotationally asymmetric surface configuration that corrects aberrations due to decentration,
wherein at least one of said third reflecting surface and said fourth reflecting surface has a curved surface configuration that gives a power to the light beam, said curved surface configuration being a rotationally asymmetric surface configuration that corrects aberrations due to decentration,
wherein said first prism member and said second prism member are arranged to form an intermediate image plane in an optical path between said second reflecting surface and said third reflecting surface, and
wherein said first exit surface has a curved surface configuration that gives a power to the light beam, said curved surface configuration being a rotationally asymmetric surface configuration that corrects aberrations due to decentration.

3. An image-forming optical system according to claim 1 or 2, wherein the rotationally asymmetric surface configuration of at least one of said first prism member and said second prism member is a plane-symmetry free-form surface having only one plane of symmetry.

4. An image-forming optical system according to claim 3, wherein the one and only plane of symmetry of the plane-symmetry free-form surface of said at least one of said first prism member and said second prism member is coincident with a plane formed by an axial principal ray traveling along said first intersecting optical paths.

5. An image-forming optical system according to claim 4, wherein the one and only plane of symmetry of the plane-symmetry free-form surface of said at least one of said first prism member and said second prism member is coincident with a plane formed by an axial principal ray traveling along said second intersecting optical paths.

6. An image-forming optical system having positive refracting power as a whole for forming an object image, said image-forming optical system comprising:
a first prism member formed from a medium having a refractive index (n) larger than 1 (n>1); and a second prism member formed from a medium having a refractive index (n) larger than 1 (n>1);

said first prism member comprising:
  a first entrance surface through which a light beam from an object enters said first prism member;
  a first reflecting surface and a second reflecting surface, which reflect said light beam within said first prism member; and
  a first prism exit surface through which said light beam exits said first prism member;

said second prism member comprising:
  a second prism entrance surface through which the light beam from said first prism member enters said second prism member;
  a third reflecting surface and a fourth reflecting surface; and
  a first exit surface through which said light beam exits said second prism member, wherein said first prism exit surface and said second prism entrance surface are positioned to face each other across an air spacing, wherein said first prism member forms first intersecting optical paths in which an optical path connecting said second reflecting surface and said first prism exit surface intersects an optical path connecting said first entrance surface and said first reflecting surface, wherein said second prism member forms second intersecting optical paths in which an optical path connecting said second prism entrance surface and said third reflecting surface intersects an optical path connecting said fourth reflecting surface and said first exit surface, wherein at least one of said first reflecting surface and said second reflecting surface has a curved surface configuration that gives a power to the light beam, said curved surface configuration being a rotationally asymmetric surface configuration that corrects aberrations due to decentration, wherein at least one of said third reflecting surface and said fourth reflecting surface has a curved surface configuration that gives a power to the light beam, said curved surface configuration being a rotationally asymmetric surface configuration that corrects aberrations due to decentration, wherein said first prism member and said second prism member are arranged to form an intermediate image plane in an optical path between said second reflecting surface and said third reflecting surface, and wherein optical surfaces of said first prism member that are closer to an object side than said intermediate image plane are arranged to correct decentration aberrations as a whole and optical surfaces of said second prism member that are closer to an image-formation plane side than said intermediate image plane are arranged to correct decentration aberrations as a whole so that said intermediate image plane is formed in an approximately planar shape.

7. An image-forming optical system having positive refracting power as a whole for forming an object image, said image-forming optical system comprising:
  a first prism member formed from a medium having a refractive index (n) larger than 1 (n>1); and
  a second prism member formed from a medium having a refractive index (n) larger than 1 (n>1);
  said first prism member comprising:
    a first entrance surface through which a light beam from an object enters said first prism member;
    a first reflecting surface and a second reflecting surface, which reflect said light beam within said first prism member; and
    a first prism exit surface through which said light beam exits said first prism member;
  said second prism member comprising:
    a second prism entrance surface through which the light beam from said first prism member enters said second prism member;
    a third reflecting surface and a fourth reflecting surface; and
    a first exit surface through which said light beam exits said second prism member,
  wherein said first prism exit surface and said second prism entrance surface are positioned to face each other across an air spacing,
  wherein said first prism member forms first intersecting optical paths in which an optical path connecting said second reflecting surface and said first prism exit surface intersects an optical path connecting said first entrance surface and said first reflecting surface,
  wherein said second prism member forms second intersecting optical paths in which an optical path connecting said second prism entrance surface and said third reflecting surface intersects an optical path connecting said fourth reflecting surface and said first exit surface,
  wherein at least one of said first reflecting surface and said second reflecting surface has a curved surface configuration that gives a power to the light beam, said curved surface configuration being a rotationally asymmetric surface configuration that corrects aberrations due to decentration,
  wherein at least one of said third reflecting surface and said fourth reflecting surface has a curved surface configuration that gives a power to the light beam, said curved surface configuration being a rotationally asymmetric surface configuration that corrects aberrations due to decentration,
  wherein said first prism member and said second prism member are arranged to form an intermediate image plane in an optical path between said second reflecting surface and said third reflecting surface, and
  wherein, when powers in X and Y directions of an entire optical system are denoted by Px and Py, respectively, and powers in the X direction of the first reflecting surface, the second reflecting surface, the third reflecting surface and the fourth reflecting surface are denoted by Px1-1, Px1-2, Px2-1 and Px2-2, respectively, and further powers in the Y direction of the first reflecting surface, the second reflecting surface, the third reflecting surface and the fourth reflecting surface are denoted by Py1-1, Py1-2, Py2-1 and Py2-2, respectively, the following condition is satisfied:

$$0.4 < Px1\text{-}1/Px \leq 0.9.$$

8. An image-forming optical system having positive refracting power as a whole for forming an object image, said image-forming optical system comprising:
  a first prism member formed from a medium having a refractive index (n) larger than 1 (n>1); and
  a second prism member formed from a medium having a refractive index (n) larger than 1 (n>1);
  said first prism member comprising:
    a first entrance surface through which a light beam from an object enters said first prism member;

a first reflecting surface and a second reflecting surface, which reflect said light beam within said first prism member; and a first prism exit surface through which said light beam exits said first prism member;

said second prism member comprising:

a second prism entrance surface through which the light beam from said first prism member enters said second prism member;

a third reflecting surface and a fourth reflecting surface; and a first exit surface through which said light beam exits said second prism member, wherein said first prism exit surface and said second prism entrance surface are positioned to face each other across an air spacing, wherein said first prism member forms first intersecting optical paths in which an optical path connecting said second reflecting surface and said first prism exit surface intersects an optical path connecting said first entrance surface and said first reflecting surface, wherein said second prism member forms second intersecting optical paths in which an optical path connecting said second prism entrance surface and said third reflecting surface intersects an optical path connecting said fourth reflecting surface and said first exit surface, wherein at least one of said first reflecting surface and said second reflecting surface has a curved surface configuration that gives a power to the light beam, said curved surface configuration being a rotationally asymmetric surface configuration that corrects aberrations due to decentration, wherein at least one of said third reflecting surface and said fourth reflecting surface has a curved surface configuration that gives a power to the light beam, said curved surface configuration being a rotationally asymmetric surface configuration that corrects aberrations due to decentration, wherein said first prism member and said second prism member are arranged to form an intermediate image plane in an optical path between said second reflecting surface and said third reflecting surface, and wherein, when powers in X and Y directions of an entire optical system are denoted by Px and Py, respectively, and powers in the X direction of the first reflecting surface, the second reflecting surface, the third reflecting surface and the fourth reflecting surface are denoted by Px1-1, Px1-2, Px2-1 and Px2-2, respectively, and further powers in the Y direction of the first reflecting surface, the second reflecting surface, the third reflecting surface and the fourth reflecting surface are denoted by Py1-1, Py1-2, Py2-1 and Py2-2, respectively, the following condition is satisfied:

$$0.1 < Px1\text{-}2/Px < 0.6.$$

9. An image-forming optical system having positive refracting power as a whole for forming an object image, said image-forming optical system comprising:

a first prism member formed from a medium having a refractive index (n) larger than 1 (n>1); and a second prism member formed from a medium having a refractive index (n) larger than 1 (n>1);

said first prism member comprising:

a first entrance surface through which a light beam from an object enters said first prism member;

a first reflecting surface and a second reflecting surface, which reflect said light beam within said first prism member; and a first prism exit surface through which said light beam exits said first prism member;

said second prism member comprising:

a second prism entrance surface through which the light beam from said first prism member enters said second prism member;

a third reflecting surface and a fourth reflecting surface; and a first exit surface through which said light beam exits said second prism member, wherein said first prism exit surface and said second prism entrance surface are positioned to face each other across an air spacing, wherein said first prism member forms first intersecting optical paths in which an optical path connecting said second reflecting surface and said first prism exit surface intersects an optical path connecting said first entrance surface and said first reflecting, surface, wherein said second prism member forms second intersecting optical paths in which an optical path connecting said second prism entrance surface and said third reflecting surface intersects an optical path connecting said fourth reflecting surface and said first exit surface, wherein at least one of said first reflecting surface and said second reflecting surface has a curved surface configuration that gives a power to the light beam, said curved surface configuration being a rotationally asymmetric surface configuration that corrects aberrations due to decentration, wherein at least one of said third reflecting surface and said fourth reflecting surface has a curved surface configuration that gives a power to the light beam, said curved surface configuration being a rotationally asymmetric surface configuration that corrects aberrations due to decentration, wherein said first prism member and said second prism member are arranged to form an intermediate image plane in an optical path between said second reflecting surface and said third reflecting surface, and wherein, when powers in X and Y directions of an entire optical system are denoted by Px and Py, respectively, and powers in the X direction of the first reflecting surface, the second reflecting surface, the third reflecting surface and the fourth reflecting surface are denoted by Px1-1, Px1-2, Px2-1 and Px2-2, respectively, and further powers in the Y direction of the first reflecting surface, the second reflecting surface, the third reflecting surface and the fourth reflecting surface are denoted by Py1-1, Py1-2, Py2-1 and Py2-2, respectively, the following condition is satisfied:

$$0.37 \leq Px2\text{-}1/Px < 1.$$

10. An image-forming optical system having positive refracting power as a whole for forming an object image, said image-forming optical system comprising:

a first prism member formed from a medium having a refractive index (n) larger than 1 (n>1); and a second prism member formed from a medium having a refractive index (n) larger than 1 (n>1);

said first prism member comprising:

a first entrance surface through which a light beam from an object enters said first prism member;

a first reflecting surface and a second reflecting surface, which reflect said light beam within said first prism member; and a first prism exit surface through which said light beam exits said first prism member;

said second prism member comprising:

a second prism entrance surface through which the light beam from said first prism member enters said second prism member;

a third reflecting surface and a fourth reflecting surface; and a first exit surface through which said light beam exits said second prism member, wherein said first prism exit surface and said second prism entrance surface are positioned to face each other across an air spacing, wherein said first prism member forms first intersecting optical paths in which an optical path connecting said second reflecting surface and said first prism exit surface intersects an optical path connecting said first entrance surface and said first reflecting surface, wherein said second prism member forms second intersecting optical paths in which an optical path connecting said second prism entrance surface and said third reflecting surface intersects an optical path connecting said fourth reflecting surface and said first exit surface, wherein at least one of said first reflecting surface and said second reflecting surface has a curved surface configuration that gives a power to the light beam, said curved surface configuration being a rotationally asymmetric surface configuration that corrects aberrations due to decentration, wherein at least one of said third reflecting surface and said fourth reflecting surface has a curved surface configuration that gives a power to the light beam, said curved surface configuration being a rotationally asymmetric surface configuration that corrects aberrations due to decentration, wherein said first prism member and said second prism member are arranged to form an intermediate image plane in an optical path between said second reflecting surface and said third reflecting surface, and wherein, when powers in X and Y directions of an entire optical system are denoted by $Px$ and $Py$, respectively, and powers in the X direction of the first reflecting surface, the second reflecting surface, the third reflecting surface and the fourth reflecting surface are denoted by $Px1\text{-}1$, $Px1\text{-}2$, $Px2\text{-}1$ and $Px2\text{-}2$, respectively, and further powers in the Y direction of the first reflecting surface, the second reflecting surface, the third reflecting surface and the fourth reflecting surface are denoted by $Py1\text{-}1$, $Py1\text{-}2$, $Py2\text{-}1$ and $Py2\text{-}2$, respectively, the following condition is satisfied:

$$0.5 < Px2\text{-}1/Py2\text{-}1 < 2.0.$$

* * * * *